(12) United States Patent
Dacre

(10) Patent No.: US 8,251,306 B2
(45) Date of Patent: Aug. 28, 2012

(54) TURBOFAN ENGINE FOR STOL AIRCRAFT

(75) Inventor: Mike Dacre, Staufen (CH)

(73) Assignee: Avcen Limited, London (GB)

( * ) Notice: Subject to any disclaimer, the term of this patent is extended or adjusted under 35 U.S.C. 154(b) by 1037 days.

(21) Appl. No.: 12/091,289

(22) PCT Filed: Oct. 25, 2006

(86) PCT No.: PCT/GB2006/003967
§ 371 (c)(1),
(2), (4) Date: Jul. 7, 2008

(87) PCT Pub. No.: WO2007/049032
PCT Pub. Date: May 3, 2007

(65) Prior Publication Data
US 2008/0290213 A1 Nov. 27, 2008

(30) Foreign Application Priority Data

Oct. 26, 2005 (GB) .................................. 0521844.1

(51) Int. Cl.
*B64C 15/02* (2006.01)
(52) U.S. Cl. ..................................... 244/23 D; 244/12.5
(58) Field of Classification Search ................ 244/23 D, 244/53 R, 54, 55, 12.5
See application file for complete search history.

(56) References Cited

U.S. PATENT DOCUMENTS

| | | | |
|---|---|---|---|
| 3,149,805 A | 9/1964 | Frey | |
| 3,381,474 A | 5/1968 | Gist | |
| 3,769,797 A * | 11/1973 | Stevens | 60/226.1 |
| 3,861,140 A | 1/1975 | Krabacher | |
| 3,863,867 A | 2/1975 | Souslin | |
| 3,893,638 A * | 7/1975 | Kelley | 244/12.5 |
| 3,920,203 A * | 11/1975 | Moorehead | 244/207 |
| 4,077,206 A | 3/1978 | Ayyagari | |
| 4,205,813 A * | 6/1980 | Evans et al. | 244/12.5 |
| 4,358,074 A * | 11/1982 | Schoen et al. | 244/12.4 |
| 4,398,683 A * | 8/1983 | Schmetzer | 244/12.5 |
| 4,481,698 A | 11/1984 | Salerno | |
| 4,525,998 A | 7/1985 | Schwartz | |
| 4,731,991 A | 3/1988 | Newton | |
| 4,969,614 A * | 11/1990 | Capuani | 244/12.4 |
| 5,178,922 A | 1/1993 | Ferrier | |
| 5,722,231 A * | 3/1998 | Porte | 60/226.2 |
| 2002/0073690 A1 | 6/2002 | Tse | |
| 2003/0033798 A1 * | 2/2003 | Dickau | 60/226.1 |

(Continued)

FOREIGN PATENT DOCUMENTS

CA 2105044 7/1994

(Continued)

*Primary Examiner* — Tien Dinh
(74) *Attorney, Agent, or Firm* — Levenfeld Pearlstein, LLC

(57) ABSTRACT

A module (10) for use with a bypass turbofan engine. The module comprises a hot flow channel through which the hot gas flow generated by the engine can flow and a bypass flow channel (14) through which the bypass air generated by the engine can flow. Part of the bypass air may be re-directed to be exhausted from the module at an angle relative to the longitudinal axis of the module so as to create vertical thrust. The hot flow channel may be separated from the bypass flow channel by a porous separator (12) that allows a degree of mixing between the hot gas flowing in the hot gas flow channel and the cold gas flowing in the cold gas flow channel.

24 Claims, 15 Drawing Sheets

U.S. PATENT DOCUMENTS

2004/0118974 A1    6/2004   Colotte et al.

FOREIGN PATENT DOCUMENTS

| | | |
|---|---|---|
| EP | 0852290 | 7/1998 |
| EP | 0861978 | 9/1998 |
| EP | 1013412 | 6/2000 |
| EP | 1375825 | 1/2004 |
| EP | 1609719 | 12/2005 |

* cited by examiner

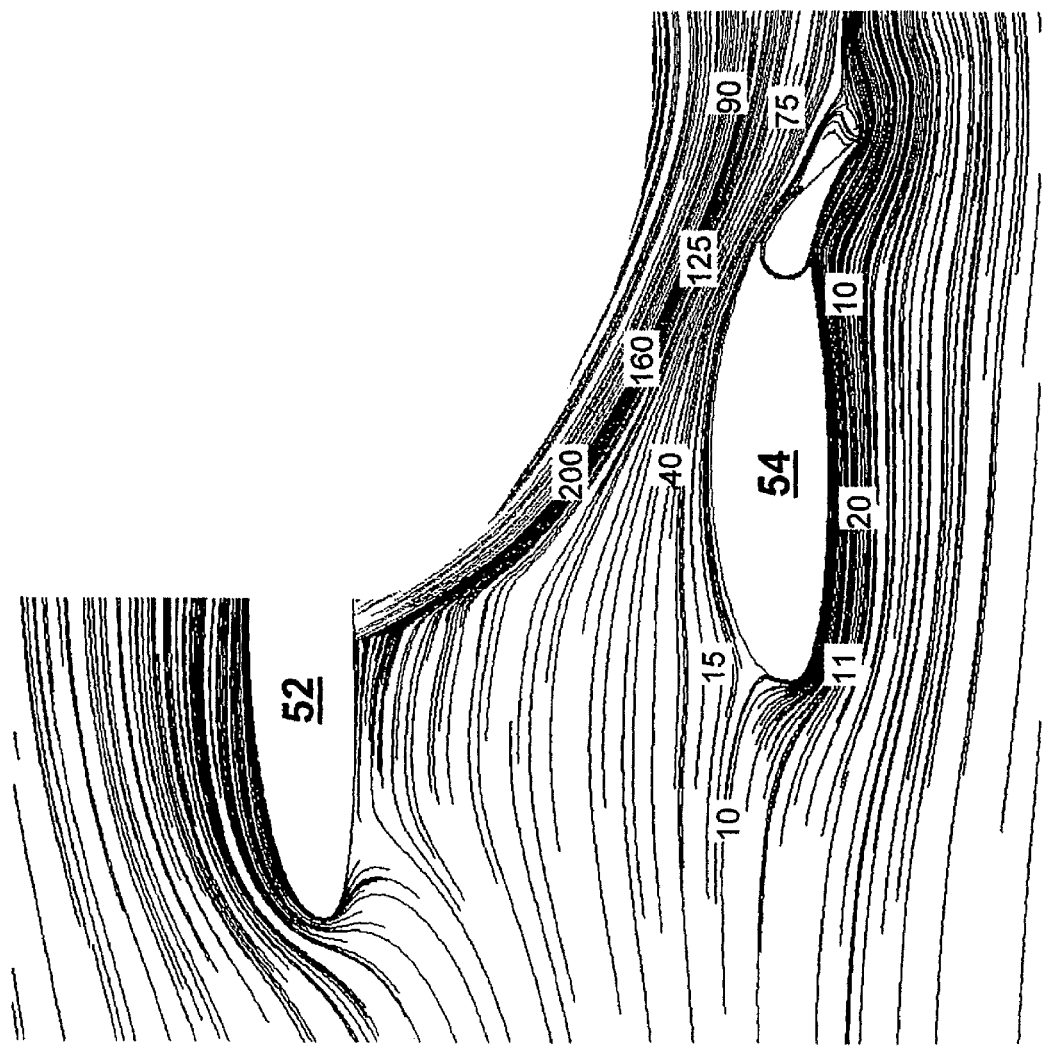

TURBOFAN ENGINE FOR STOL AIRCRAFT

FIELD OF THE INVENTION

The present invention relates to an improved engine for use with an aircraft, and to an aircraft including such an engine. The invention also relates to a module for use with an engine, particularly for use with a bypass turbofan type engine.

DISCUSSION OF THE PRIOR ART

Jet bypass turbofan engines are well known propulsion systems for aircraft.

A jet bypass turbofan engine includes a turbofan engine having an inlet for air, a compressor for compressing the inlet air, a combustion section in which fuel is combusted to cause the expansion of the compressed air and a turbine which is rotated by the expanded, heated compressed air. The expanded, heated compressed air passes through the rear of the engine as a jet of heated gas. The rotation of the turbine is used to drive the compressor that compresses the incoming air. Further, the rotation of the turbine is used to drive an inlet fan which draws air into the engine. A portion of the inlet air is passed to the compressor for compression in the turbofan engine. Another portion of the air is channeled around the turbofan engine as 'bypass' air. This air flows through the bypass channel at a high speed. Mixers are provided in a downstream part of the engine for mixing the cold, high velocity, bypass air with the jet of heated gas exhausted from the turbofan engine. Together, the mixed high velocity bypass air and heated exhaust gas are jetted from the engine to provide thrust.

The generally horizontal jet of exhaust gas from the engine provides forward thrust to propel an aircraft to which the engine is mounted. When the aircraft is on the ground and is accelerated to reach a certain velocity, the aircraft is able to take off. However, especially for large planes, it is necessary to provide a long runway to enable the thrust from the jet engine to accelerate the aircraft to the required velocity to enable the aircraft to take off. This means that aircraft are only able to take off, and therefore are only able to land, at locations where there is a sufficiently long runway. This means that aircraft are often not able to land close to the final destination of passengers.

Vertical and short takeoff and landing (V/STOL) aircraft are known. It is known to mount a turbofan engine on an aircraft in such a way that the entire engine or the entire jet efflux can be rotated such that the jet of exhaust gas from the engine jets in a generally vertical direction rather than in a horizontal direction. This vertical jet produces an upward thrust, allowing the aircraft to take off without requiring a high velocity. An example of the use of such a system is found in the well known "Harrier" jump jet. However, whilst this vertical jet can allow the aircraft to take off vertically, this uses a significant amount of energy, and therefore is not an efficient way for an aircraft to take off.

Another problem with existing bypass turbofan engines is that they generate a considerable amount of engine noise. One source of noise is the combustion process in the engine and vibrations associated with the combustion process. Jet noise is further generated when the hot gas exhausted from the tail end of the engine contacts cold ambient air and thereby induces a rapid expansion of this ambient air. It is desirable to reduce the amount of noise emitted by an engine to reduce the amount of disturbance caused by air traffic, in particular in heavily populated areas.

SUMMARY OF THE INVENTION

According to one aspect of the present invention, a module for use with a bypass turbofan jet engine is provided. The module is generally elongate, and includes a generally axially extending central portion through the length of the module for exhausting the hot exhaust gas from the engine, and a generally axially extending peripheral portion surrounding the central portion for the bypass air from the engine. An outlet is provided from the peripheral portion of the module through the outer casing to enable at least a portion of the bypass air to be directed out of the module at an angle to the axis of the module.

The remainder of the bypass air is thus exhausted in the horizontal direction and is available for creating horizontal thrust.

The module may be provided as a separate module that can be added to the exhaust end of an engine, or may be formed together with the engine. The bypass air that is directed through the outlet provides an element of thrust. By providing the outlet at an angle to the axis of the module, namely at an angle to the direction of the exhaust gas from the rear of the engine, this re-directed air will generate thrust in a direction different from that of the normal exhaust gas from the engine. In the normal operation of the engine, in which the main exhaust gas is exhausted generally horizontally from the rear of the engine, the portion of the bypass air can be directed generally vertically to produce a vertical thrust force. This can be used in take off to increase the lift and therefore decrease the velocity at which the aircraft needs to travel for take off. This can in turn mean that the aircraft can take off from a shorter runway than would otherwise be possible, which in turn makes the aircraft usable in more locations, often closer to the intended destination. During landing the aircraft can be decelerated below the normal stalling speed of the aircraft, that is the horizontal speed required for creating sufficient lift to keep the aircraft airborne when the portion of the bypass air is not redirected, while still remaining airborne as additional lift is created by the downwardly directed bypass air flow. The aircraft can thus be flown at a reduced speed just before touching the ground. The braking forces required for stopping the aircraft in a desired distance can thus be reduced and/or the distance within which the aircraft can be brought to a halt can be reduced.

It is preferred that the portion of the bypass air that passes through the outlet during takeoff is equal to or less than 25%, equal to or less than 20%, equal to or less than 15%, in the range of 1% to 15%, equal to or less than 10% or equal to or less than 5% of the total volume of bypass air leaving the engine.

It is preferred that the outlet for the portion of bypass air is selectively controllable.

In a preferred example of the invention, an adjustable baffle is provided within the peripheral portion/bypass airflow of the module, preferably downstream of the outlet. The baffle may comprise a number of overlying petals or sheets that can be moved into the peripheral portion so as to hinder an air flow in the peripheral portion. Adjustment of the baffle, which may be achieved by an electrically or pneumatically controlled ram, is able to control the air flow through the peripheral portion. This can help control the thrust generated by the air jets from the outlet and from the rear of the module.

It is preferred that the outlet can be selectively opened and closed to allow or hinder the portion of bypass air from being exhausted at an angle to the main thrust or to vary the amount of bypass air that is allowed to exhaust through the opening. When the outlet is closed, none of the bypass air will be exhausted at an angle to the main direction of thrust, and therefore all of the available thrust is used to drive the aircraft forwards. It is further preferred that the distance over which the baffle extends into the bypass air flow paths is additionally selectively controlled. Control of the opening state of the opening and of the deployment state of the baffle permits varying the amount of bypass air that is allowed to exhaust through the opening. This allows control of the bypass air to give a varied degree of thrust at an angle to the main thrust from the exhaust. Raising of the baffle increases the pressure in the part of the peripheral portion upstream of the baffle. The increased pressure forces a portion of the bypass air flow out of the opening. The increase in pressure caused by the baffle does not extend upstream of the opening.

It is also preferred that the relative orientation of the air through the outlet can be selectively controlled. This allows control of the direction of the additional thrust. This can be achieved by the provision of nozzles, the orientation of which can be controlled. For example, during take off, the nozzle can be orientated so that the portion of the air is jetted generally vertically downwards to increase the lift. It is preferred that angle to the axis of the module referred to above is between 45 degrees and 90 degrees. The direction of the part of the cold air flow exhausted to below the module has thus an angle between 0 degrees and 45 degrees relative to the vertical direction and directed backwardly.

It will be appreciated that more than one outlet may be provided from the module. In this case, the outlets may be controllable independently or in common.

It is preferred that the module includes a separator between the central and peripheral portions to separate the bypass air and the hot exhaust gas. An advantage of keeping the relatively cold bypass air and the relatively hot exhaust gas from the turbine separate, and using a portion of the cold bypass air alone to produce the directional thrust, means the overall noise level of the engine can be kept down. This means that the module is able to produce a directional thrust component at a much lower noise level than would be the case merely by redirecting the entire engine or the entire jet efflux so that all of the thrust has a vertical component.

Furthermore, where the directional thrust is directly vertically, by merely directing the cold air downwards rather than the hot exhaust gas from the engine, there is less risk of burning or otherwise damaging the ground or any aircraft components below the engine.

In a preferred example, the separator is in the form of an open network of porous ferrite fibre mesh. The open network of porous ferrite fibre mesh allows a small portion of the hot exhaust gas to permeate into the open fibre network as the cold bypass air cools the network.

This has been recognised as being advantageous in its own right and according to another aspect of the present invention there is provided a module for use with a bypass turbofan jet engine. The module comprises a generally elongate housing, and includes a central portion extending through the length of the module for exhausting the hot exhaust gas from the engine and a peripheral portion surrounding the central portion for the bypass air from the engine. The module further includes a separator for separating the central and peripheral portions. The separator comprises an open network of porous mesh that allows a degree of fluid flow through a wall of the separator.

The use of a mesh separator between the central and peripheral portions will enable a reduction in the noise, thought to be achieved by a reduction in the kinetic energy, from the engine.

The separator has been recognised as being advantageous in its own right and according to another aspect of the present invention there is provided a separator comprising an open network of porous mesh for use in separating the bypass air flow of a bypass turbofan jet engine from the hot gas flow of the engine.

This form of separator may replace the mixers normally used in turbine engines. As the preferred separator can be manufactured to be more lightweight than such mixers the total weight of an engine can be reduced. Alternatively the separator can be used as a stage upstream of a mixer.

The ferrite fibre material forming the mesh preferably consists of stainless steel ferrite fibres. The mesh is preferably formed by sintering. The ferrite fibres preferably have a mean length of between 300 and 600 µm, more preferably between 300 and 500 µm and most preferably between 300 and 400 µm. The length to diameter ratio of the fibres is preferably between 6 and 12, more preferably between 6 and 9 and most preferably between 6 and 7. Fibres having a length of less than 300 µm and a length to diameter ratio of less than 6 may be used to generate porous fibre mesh with a higher density.

It is preferred that a means for restricting fluid flow through the wall of the separator is provided. This means is preferably adapted to allow more fluid to pass through a downstream part of the separator than through a part of the separator further upstream than the downstream part. The means may take the form of a sleeve that includes holes to permit an amount of air to pass through the separator.

The sleeve can be provided around the separator, inside the separator or embedded in the separator. In the upstream portion of the module, the sleeve can have small holes to allow a small amount of hot gas to permeate through the separator. By permitting only a small amount of hot gas to pass through the separator it is ensured that, in modules having an outlet as described above, the portion of bypass air that may be directed out of the peripheral portion is not excessively heated by the hot gas. Downstream, the openings in the sleeve can be of increased size. The sleeve may be a sheet material comprising holes or a mesh material.

Alternatively or in addition to the above discussed sleeve another way of adjusting the amount of gas that can pass through the separator is to provide the separator with a porosity appropriate to restrict fluid flow to a desired degree. The porosity of the porous fibre mesh at a downstream part of the separator may be chosen to be preferably higher than the porosity of the porous fibre mesh in a part upstream of the downstream part. The porosity of the porous fibre mesh can increase along the length of the separator in a downstream direction. This increase may be a gradual increase or a stepped increase.

The separator is preferably formed of a plurality of portions arranged adjacent each other along a length of the separator. The properties of one of the portions differs from the properties of another one of the portions. The porosity of a portion arranged in a downstream part of the separator is preferably higher than the porosity of a portion arranged upstream of the portion arranged in the downstream part of the separator. More preferably the porosity of each of the portions is higher than the porosity of an adjacent portion arranged further upstream. Providing the separator in the form of a plurality of portions allows that, when part of the separator gets worn or damaged only a short length of the separator needs to be removed and replaced. This can save material costs and also reduces the amount of work involved in accessing and replacing the separator part when compared to the replacing of the entire separator.

The separator, or one or more of the portions is preferably an annulus that is formed of a plurality of segments wherein each such segment extends around only a fraction of the circumference of the annulus. A separator segmented into such segments and portions allows easy removal of a segment or portion, for example when such a segment is damaged and needs to be replaced.

Segmenting the separator has been recognised as being advantageous in its own right and according to an another aspect of the present invention there is provided an annular separator for separating the bypass air flow of a bypass turbofan jet engine from the hot gas flow of the engine. The circumference of the separator is segmented into a number of segments over at least part of the length of the separator.

Segments or sections arranged in an upstream part of the separator will likely experience a higher temperature than segments or sections arranged further downstream. Gaps between the segments and sections can be arranged to be larger in an upstream section than in a downstream section to account for the differences in heat expansion of these sections.

Means for supporting the network of porous mesh are further preferably provided. This means may take the form of brackets and/or a sleeve arranged inside or outside of the fibre mesh or embedded in the fibre mesh. This sleeve can be the same sleeve used for imposing a gas flow restriction on the porous mesh.

According to another aspect of the invention, there is provided an aircraft including a bypass turbofan jet engine and associated module according to the first and/or second aspects of the invention.

In this case, it is preferred that the aircraft includes at least two bypass turbofan jet engines and modules. Where the aircraft includes two or more engines, it is preferred that these are arranged symmetrically on the aircraft. For example, where two engines are provided, it is preferred that one engine is provided on each side of the aircraft. Where the module includes an opening for directing a portion of the bypass air at an angle to the main exhaust jet, it is preferred that the outlets are controlled so that the portion of the bypass air flowing at an angle from each of the engines is the same. This is important since otherwise there is a risk that the directional thrust component may twist or turn the aircraft. In particular, it is preferred that the sensors are provided to sense the extent to which the outlets are open and/or the direction of the airflow through the outlets and/or the velocity of air passing through the outlets to ensure that these are the same. In the event that a single engine failure should occur, or the total thrust or vertical thrust is reduced outside of a 5% differential limit between the engines, then the vertical thrust component will either be removed from the live engine or reduced accordingly.

An engine can be mounted either above or below the wings. In the case of over-wing engines in which, the module is arranged to direct a portion of the bypass air at an angle to the main exhaust jet, ducting may be provided through the wing of the aircraft to direct the portion of the bypass air through the wing to provide the thrust. In this case, nozzles can be provided at the end of the ducting to control the direction of the thrust. With the engines mounted either under wing or over wing, the vertically directed by-pass airflow can be vented to atmosphere via one or more nozzle.

A part of the re-directed bypass air may be bled of the flow or re-directed bypass air, for example through a T-junction in the through wing ducting, and blown over the upper surface of the wing of the aircraft. The fluid flow created in this manner can, for example, compensate for small irregularities in the airflow along a downstream part of the lower surface of the wing, such as irregularities that may be caused by suction through the gap between the trailing edge of the wing and the leading edge of a flap attached to the wing.

It has been recognised that the directed air flow is not only useful in creating vertical thrust but can also be directed over an upper surface of an airfoil of the aircraft to create further lift. This has been recognised as being advantageous in its own right and according to another aspect of the present invention there is provided an aircraft comprising a pair of bypass turbofan engines wherein each engine is associated with a module according to the first aspect of the present invention and with an airfoil. The engines and modules are arranged so that at least part of the portion of the diverted bypass air directed out of the modules flows over at least part of an upper surface of the associated airfoil at least when the aircraft travels at a predetermined speed. The predetermined speed is preferably the normal stalling speed of the aircraft or a speed suitable for take off and/or landing of the aircraft. The portion of the bypass air may thus be directed over the airfoil at times when lift generated by the portion of the bypass air is most useful, namely during take off or landing and/or when the aircraft would under normal circumstances and without the use of the directed air flow not be able to become or remain airborne, namely when the aircraft moves at a speed that is lower than the normal stalling speed of the aircraft. The term normal stalling speed hereby refers to the minimum speed the aircraft would be required to have to generate sufficient lift to become or remain airborne without additional air being blown over an airfoil. It will be appreciated that this aspect of the present invention is of course not only useful when the aircraft moves at a speed close to its normal stalling speed but that the advantage of increased lift can be obtained over a wide range of aircraft speeds both above and below the stalling speed. By redirecting the airflow over the wing the speed of the aircraft can be reduced at higher safe altitudes and the aircraft can loiter for prolonged periods.

The directed air flow may also be used to entrain part of the generally horizontal air flow the aircraft experiences due to the aircraft's horizontal movement. The re-directed portion of the bypass airflow thus accelerates a part of the horizontal flow with which the direct flow comes into contact. This acceleration can further improve lift, for example when the accelerated air flow is an air flow that flows over an upper surface of an airfoil.

The module is preferably arranged to, in use, direct the re-directed portion of the bypass airflow towards a downstream part of the upper surface of the airfoil, more preferably towards a downstream flap provided on the airfoil.

The airfoil towards which the re-directed portion of the bypass air is directed may be a main wing of the aircraft. In addition to this airfoil or wing the aircraft can comprise a further pair of airfoils or wings. In this case each of the engine is mounted to one airfoil or wing of the further pair of airfoils or wings. Preferably the engine is mounted above or below the further airfoil or wing.

It is preferred that the directed air flow is only activated once the aircraft has gathered the above discussed predetermined speed. The aircraft may comprise means arranged to cause the portion of bypass air to be directed out of the module at the angle to the axis of the module when the predetermined speed of the aircraft is reached.

The present invention of course also extends to a module comprising the features of a module according to the first aspect of the present invention and also the features of a module according to the second aspect of the present invention.

According to another aspect of the present invention there is provided a method of operating an aircraft comprising a module according to the above discussed first aspect of the invention during take-off. The method comprises accelerating the aircraft to a predetermined speed and starting to re-direct the portion of the bypass air once the predetermined speed has been reached.

Preferably the aircraft is accelerated to the first speed while still on the ground and the re-directing of the portion of the bypass air is also started while the aircraft is still on the ground. The downwardly directed fluid flow is then actuated to provide additional lift assisting during take off without the need for further horizontal acceleration.

It is preferred that the opening of the module is opened substantially simultaneously with the raising of the baffle of the module. To avoid an undue deceleration of the aircraft due to the reduction of horizontal thrust caused by the redirecting of bypass air flow it is preferred that the opening of the opening is completed in less than three seconds and that the baffle is raised within the same time. The method may further include the step of increasing the overall thrust output of the aircraft's engine to compensate for the loss in horizontal thrust caused by the redirecting of bypass air.

The directed air flow may be interrupted after the aircraft has become airborne so that all of the bypass air flow can again be used for generating horizontal thrust. The re-directed bypass airflow is preferably interrupted after the landing gear has been retracted. It is not as important to perform the interrupting of the directed air flow in the same speedy manner as the establishing of the air flow and it is acceptable for the opening to be closed and the baffle to be lowered over a time frame of twenty seconds or more.

It is further desirable that the direction at which the bypass air is exhausted is adjusted so that the bypass air is directed so as to maximise lift. The direction of the directed air flow can be adjusted to achieve the correct balance between vertical thrust and entrainment under in use conditions, i.e. when the exhausted cold bypass air interacts with the horizontal air flow caused by the horizontal movement of the aircraft. This adjustment could be an adjustment that does not change during the course of a flight and may be performed by a technician prior to a flight.

The present invention also extends to a method of operating an aircraft comprising a module according to the above first aspect of the present invention during landing. The method comprises approaching a runway at a landing speed and starting to re-direct the portion of the bypass air while the aircraft is airborne. The re-directed portion of the bypass air provides a lift component that assists in keeping the aircraft airborne. This may allow the speed of the aircraft to be reduced below the normal stalling speed the aircraft would have in the absence of the re-directed air flow while the aircraft is still airborne. In the method of the present invention the speed of the aircraft when contacting the ground can thus be chosen to be lower than the minimum speed required for the same aircraft in the absence of the re-directed air flow. This reduction in speed can reduce the length of runway and/or the amount of braking force required for bringing the aircraft to a halt.

The present invention also extends to a method of operating an aircraft comprising a pair of modules according to the above first aspect of the present invention, each module associated with an engine, wherein the flow or re-directed bypass air is adjusted to produce an amount of vertical thrust that is substantially equal to the amount of vertical thrust created by the other engine. The amount of vertical thrust generated by one engine may thus for example be adjusted to be within 5% of the amount of vertical thrust generated by the other engine.

While the above described methods can be performed in a manual fashion by a pilot it has been recognised that it is desirable to be able to perform these methods in an automatic fashion.

According to another aspect of the present invention there is provided a computer program product adapted to perform one or more of the above methods when executed. This computer program product may have means for actuating the baffle in the module, means for opening and/or closing the opening in the module but may also be connected to sensors that detect the speed of the aircraft so that the aircraft can automatically determine when the desired first speed is reached.

Preferably further sensors are adapted to determine an outside ambient temperate, the local wind velocity, the pressure altitude and/or the density altitude at which the runway is located. From the data obtained by the sensors the computer program product can determine the speed applicable to the particular flight conditions at which the part of the bypass air should be re-directed. It is of course not essential that such a determination is made for every flight and a situation in which the determination is made once for a given aircraft, for example after the completion of the aircraft's manufacture and possibly based on data obtained with sensors not incorporated in the aircraft, is also envisage.

BRIEF DESCRIPTION OF THE DRAWINGS

The present invention will now be described by way of example with reference to the accompanying drawings, in which:

FIG. 6A shows a velocity distribution about the wings of the aircraft shown in FIG. 4 in a further operational mode in which bypass air flow is exhausted in the downward direction;

DETAILED DESCRIPTION OF PREFERRED EXAMPLES

Figure 1A:
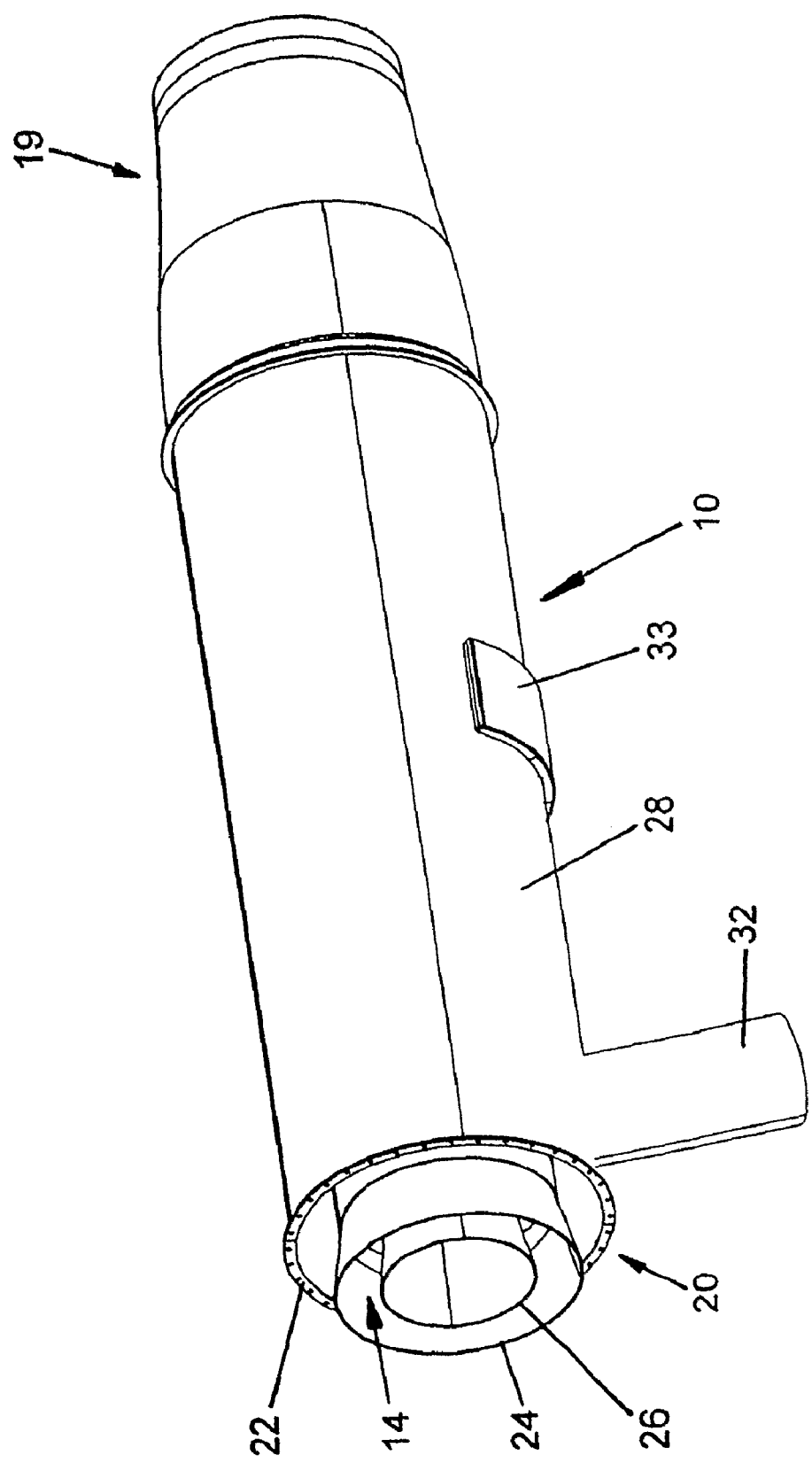
FIG. 1A shows a perspective view of a module according to the present invention.
Figure 1B:
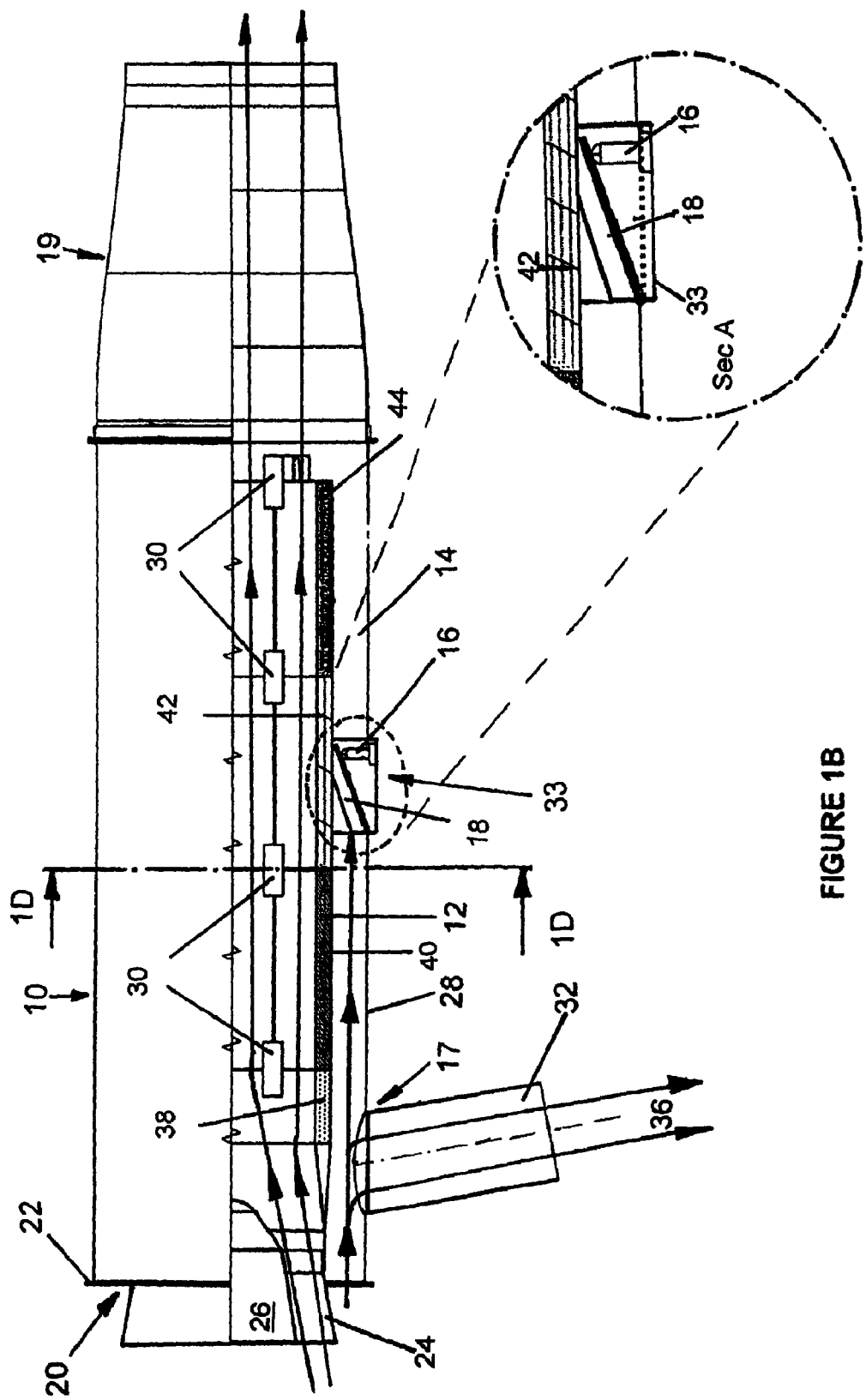
FIG. 1B shows a sectional side view of the module of FIG. 1A.
Figure 1C:
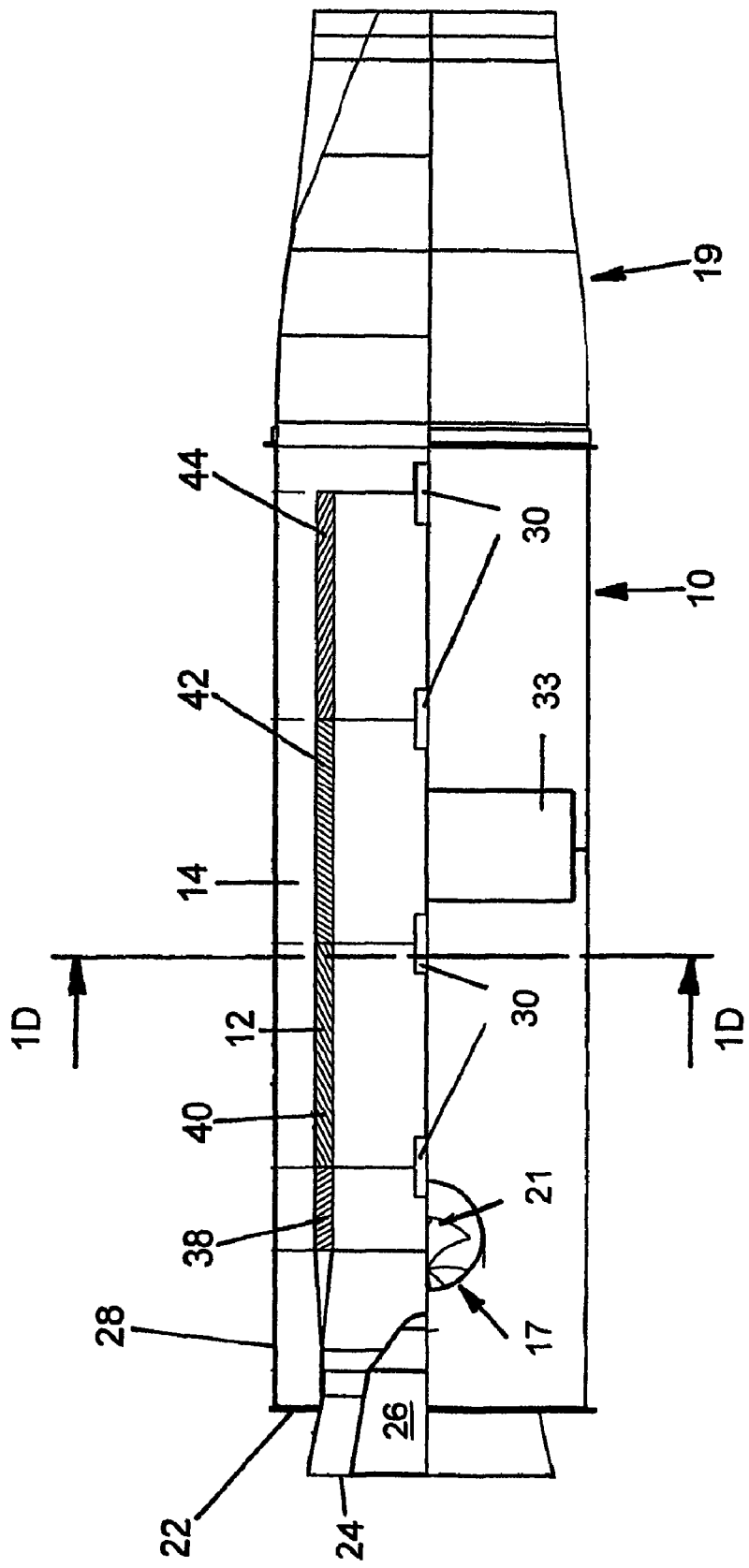
FIG. 1C shows a sectional bottom view of the module of FIGS. 1A and 1B.

FIGS. 1A, 1B and 1C show a module 10 for use with an engine according to an example of the present invention. The engine itself, which may be a bypass turbofan jet engine, such as bypass turbofan jet engines available from Honda (http://world.honda.com/AircraftEngines/), is not shown in these figures.

Bypass turbofan jet engines conventionally include an inlet fan which forces cold air into the engine. Downstream of the inlet fan, turbofan jet engines are segmented into a central core engine and an annular bypass flow region surrounding the core engine. The core engine is encased in an inner casing. An outer casing is provided outside of the inner casing. The inner and the outer casing define an annular outer bypass channel through which a part of the cold air can flow to the tail end of the engine. Another part of the cold air conveyed into the engine by the inlet fan flows into the core engine and is used in the core engine's combustion process.

The core engine includes a compressor at the upstream end of the engine which compresses air introduced into the engine by the inlet fan, a combustion section in which fuel is combusted causing the heating and expansion of the compressed air, and a turbine that is rotated by the heated, compressed air. The rotation of the turbine is used to drive the inlet fan and compressor.

The module 10 is arranged to be coupled to a downstream end of a bypass turbofan engine and comprises a cap 20 for controlling the flow of both the hot gas exhausted from the rear of the core engine as well as of the cold bypass air into the module 10. The cap 20 is arranged so that it can be coupled to the inner casing of the engine in a manner that maintains the separation between the high temperature exhaust gas that has passed through the core engine, and the lower temperature, high velocity air that bypassed the core engine. A shroud may further be provided outside of the outer casing part 28 to streamline the module 10.

An outer casing part 22 of the cap 20 is arranged so that it can be connected to the outer casing of the engine without restricting flow of cold air from the engine. An inner casing part 24 of the cap 20 is dimensioned so that it can be connected to the inner casing of the engine without restricting flow of air from the bypass flow region of the engine or from the core engine. A central part 26 is further provided. This central part 26 defines the effective flow area available for the conveying of hot gas from the core engine. The cross-section of the flow area defined by the outer casing part 22 and by the inner casing part 24 and the cross-section of the flow area defined by the inner casing part 24 and the central part 26 are chosen so that their ratio is substantially the same as the ratio of the corresponding cross-sectional flow areas of the engine.

Downstream of the inner casing part 24 is a central tube/hot core, or separator, 12 to which the inner casing part 24 is connected. The central tube/hot core 12 substantially separates the hot gas from the cold air flow as will be described in more detail below. The outer casing part 22 extends into a casing part 28 that surrounds the central tube/hot core 12 and defines a cold air bypass channel 14. A nozzle 19 is provided to guide and accelerate both the hot and the cold gas flow from the downstream end of the module 10. No separator separating the hot and the cold as flows is provided in the nozzle 19.

Figure 1D:
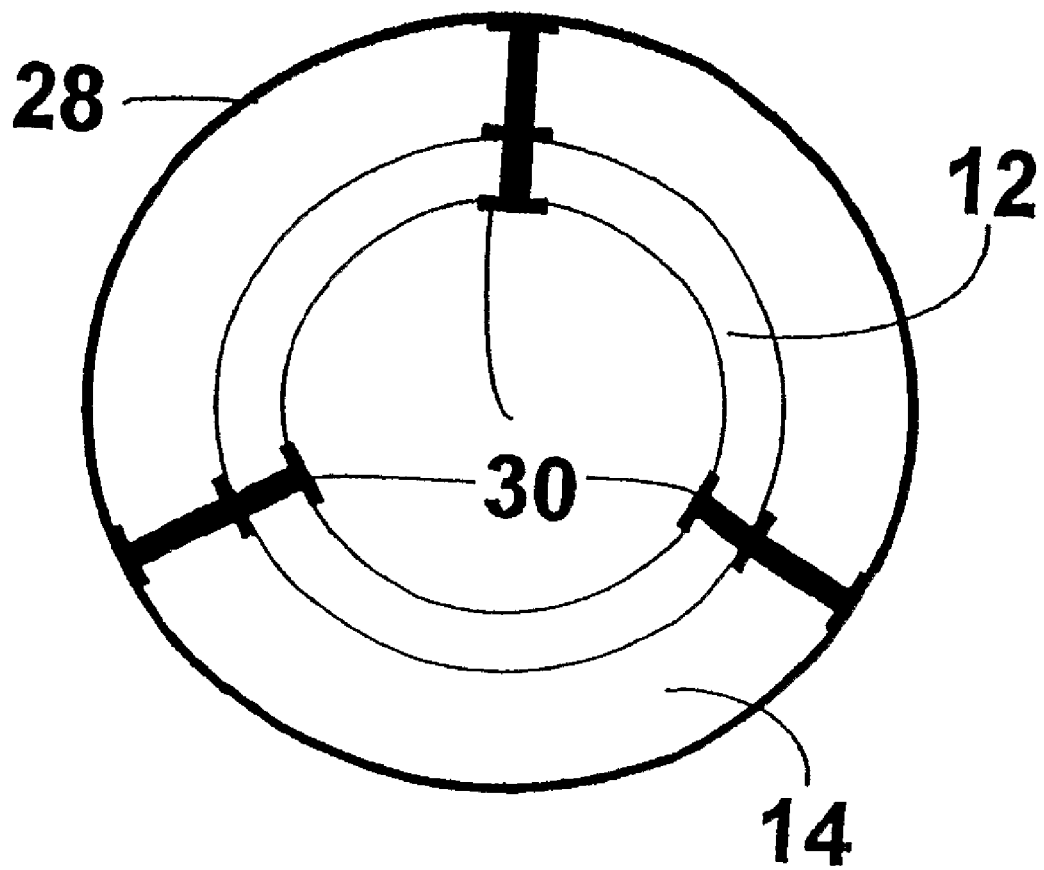
FIG. 1D shows a cross-sectional view of the module along line 1D-1D shown in FIGS. 1B and 1C.

The central tube/hot core 12 is mounted inside the casing part 28 by radially and longitudinally spaced brackets 30, as indicated in FIGS. 1B and 1C and as shown in detail in the cross-sectional view of FIG. 1D. The brackets 30 comprise a holding surface in contact with the outside of the central tube/hot core 12. In addition, a part of the bracket 30 extends from the outside of the central tube/hot core 12 through the wall of the central tube/hot core 12 and contacts and holds an inside surface of the central tube/hot core 12.

Figure 1E:
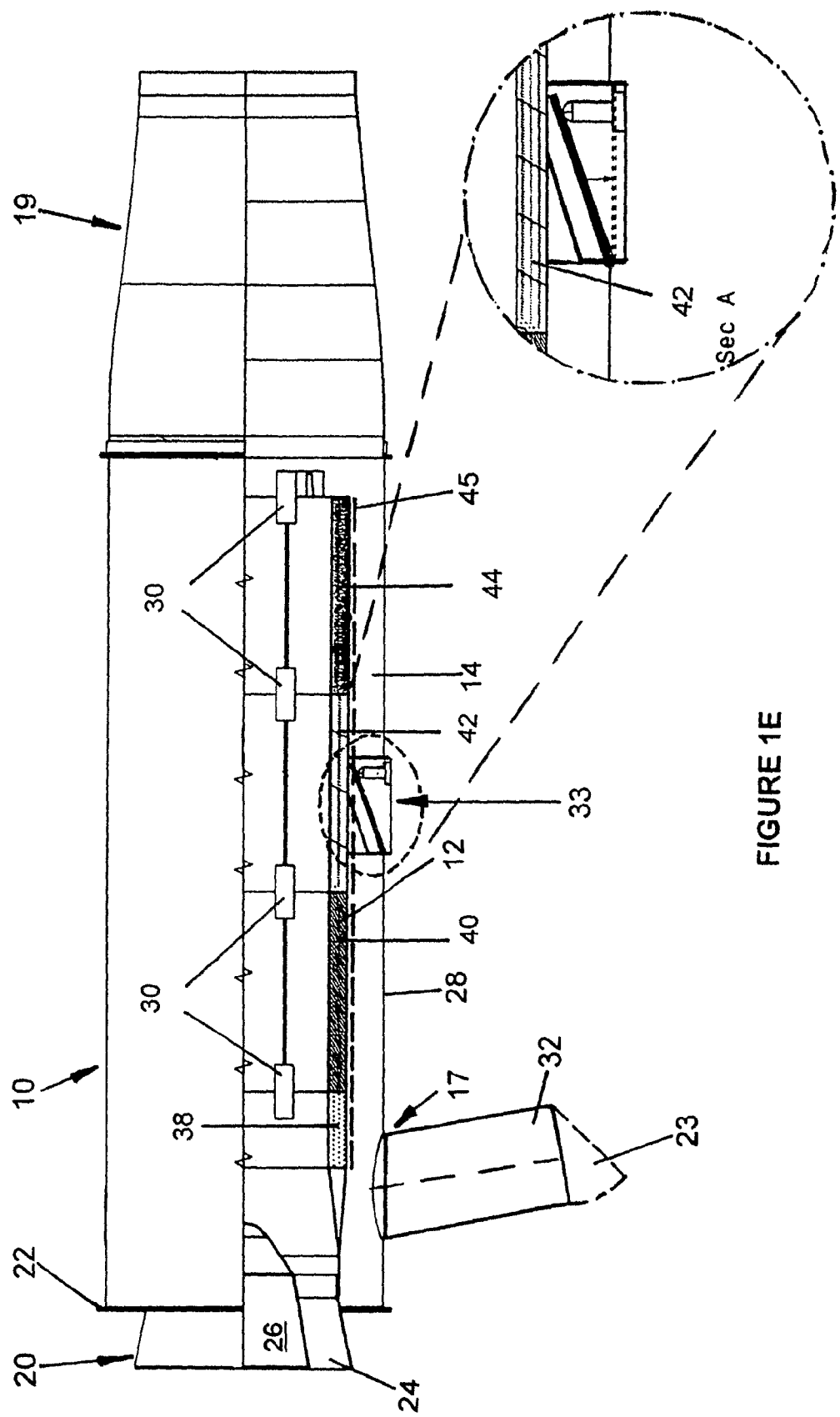
FIG. 1E shows a sectional side view of a further module comprising a sleeve around the hot core.

In the arrangement shown in FIG. 1E the central tube/hot core 12 is contained within and supported by a housing 45, or sleeve, indicated by the dashed line in FIG. 1E, which may be a mesh or a perforated sheet. The housing 45 may be made of stainless steel. The openings in the housing 45 may have an increasing size along the length of the housing 45 towards the downstream end of the engine.

As shown in FIGS. 1B and 1C, there is an opening 17 provided in the casing part 28 of the module 10, providing fluid communication between the cold air bypass channel 14 and the outside of the module 10. The opening 17 includes a closure, such as for example an iris type closure 21 as shown in FIG. 1C, which allows the opening 17 to be selectively opened and closed. Where the closure is such an iris type closure, it can be opened and closed by a rotary actuator (not shown). The opening 17 is a fluid communication with a duct 32. The duct 32 illustrated in FIGS. 1A and 1B is angled in a backward direction by 10 degrees from the vertical direction. A nozzle 23 (shown in dashed lines in FIG. 1E) may further be provided to change the direction of the re-directed bypass air flow. The bypass air flow may, for example, have a direction between 0 degrees and 45 degrees relative to the vertical direction when it exits the duct 32 or the nozzle 23 associated with the duct 32.

A baffle 18 is provided downstream of the opening 17. In one arrangement the baffle 18 is situated in a recessed section 33 shown in FIGS. 1A to C of the casing part 28 so that they do not present any resistance to the flow of the cold bypass air in the cold air bypass channel 14 when the baffle 18 is down. A ram 16 is provided to lift the baffle 18 into the cold air bypass channel so that they cause an obstruction to the flow of cold bypass air in the bypass air channel 14.

Figure 1F:
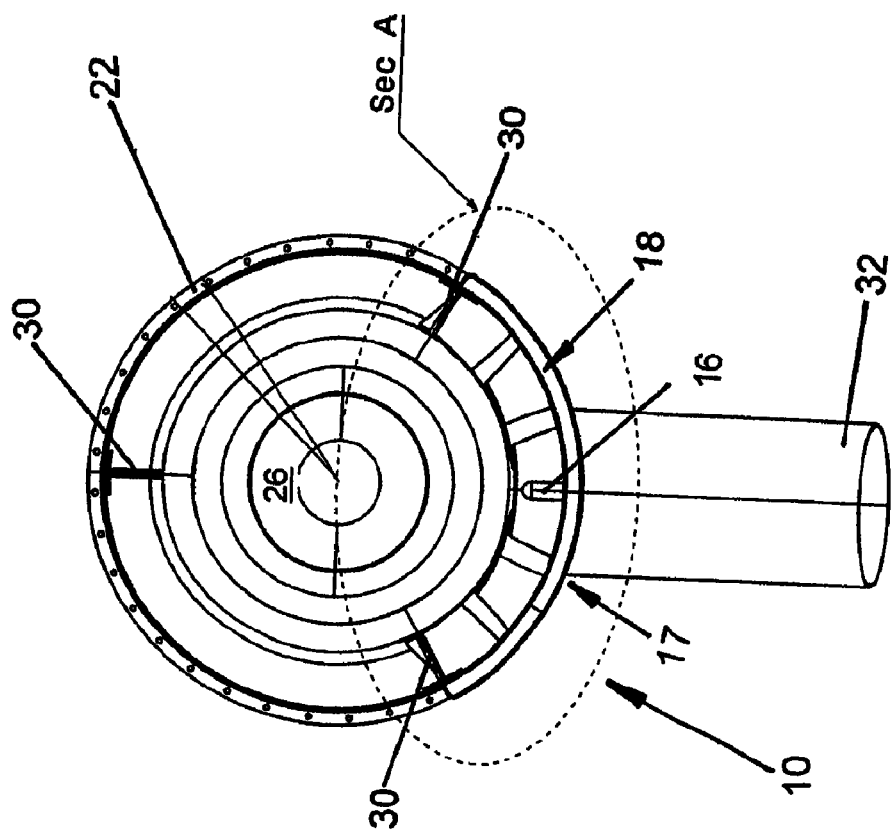
FIG. 1F shows a front view of the module of FIGS. 1A to 1C.
Figure 1G:
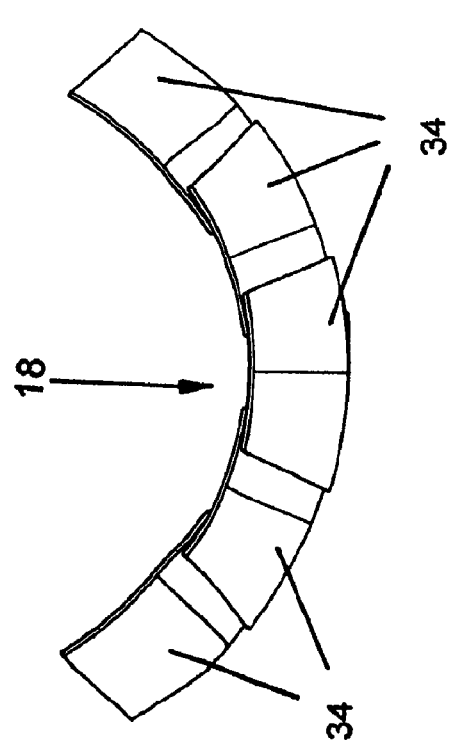
FIG. 1G shows details of the baffle.

In the illustrated preferred embodiment the baffle 18 is formed by five overlapping petals 34, as is best shown in FIGS. 1F and 1G. The ram 16 is arranged to contact the central one of these five petals 34 and to exert an upwardly directed pressure on this central petal 34. This lifts the central petal as well as the remaining petals away from the casing part 28 due to the interleaving of the petals 34. As is shown in FIGS. 1B, 1E and 1F, the petals 34 can be extended until their free ends substantially contact the outer surface of hot core/central tube 12.

It can be seen from FIG. 1F that the baffle 18/petals 34 extend only around a part of the circumference of the cold air bypass flow channel 14. In the illustrated embodiment the baffles 18 extend around a quarter of the circumference of the cold air bypass channel 14. Fully extending the petals 34 until they contact the central tube/hot core 12 can thus not lead to a complete obstruction of the cold air bypass air channel 14.

Simulations have shown that when the opening 17 is opened while the baffle 18 is lowered, the amount of air flowing into the vent is minimal. However, when the baffle 18 is raised and the closure 17 is opened simultaneously, the velocity of air flowing into the duct 32 is substantial. Tests have also confirmed that the increase in pressure created upstream of the baffle 18 by the raising of the baffle 18 extends up to the open closure 17, whereupon it is dissipated into the duct 32. This prevents surge back into the bypass engine.

Figure 2:
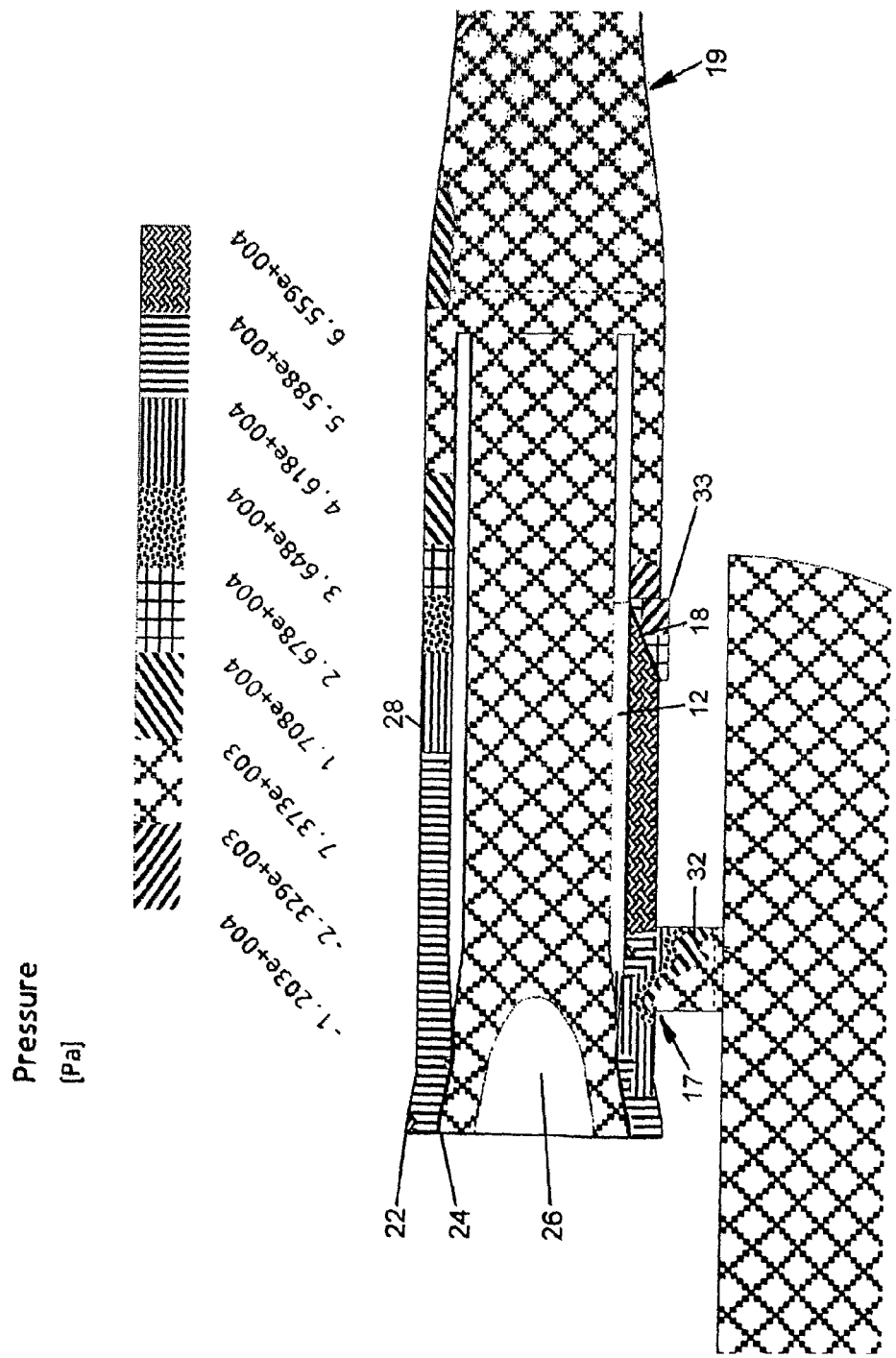
FIG. 2 shows the results of a simulation of the pressure distribution in a module comprising a porous hot core.

FIG. 2 illustrates the pressure distribution in the module 10 when the baffle 18 is raised so as to be in contact with the central tube/hot core 12 and when the closure 17 is open. It can be seen from this figure that the pressure immediately upstream of the baffle 18 is greatly increased. This increase in pressure causes the bypass air to be exhausted through the opening 17. It can further be seen that the pressure build up does not propagate back into the engine, which could cause a surge. Instead, the pressure immediately upstream of the opening 17 is lower than the pressure diametrically opposite of the opening 17.

Turning now to the operation of the module 10, in use a jet of hot exhaust gas from the turbine/core engine passes along the inside of the central tube/hot core 12, and is exhausted through the downstream end of the central tube/hot core 12. When the opening 17 is closed and the baffles 18 are aligned with the inside of the casing part 28, then cold bypass air from the engine flows unimpededly through the cold air bypass annulus 14. In this configuration the entirety of the air flow through the module 10 is exhausted at the downstream end of the module 10 through the nozzle 19 together with the hot gas flowing through the central part of the module 10 defined the central tube/hot core 12. In this configuration the entirety of the cold air flow through the bypass air channel 14 is used for creating horizontal thrust.

FIGS. 1B and 2 show the module 10 in a second, different operating mode in which the opening 17 is at least partially or fully opened. In this configuration a part of the cold bypass air passing through the channel 14 is diverted to pass through the opening 17 as airflow 36 as is indicated by the arrows in FIG. 1B. This airflow 36 will be at high velocity, since the airflow 36 is branched from the high velocity bypass air driven into the engine by the fan. Initial computer models evaluating the conditions inside of the module 10 have shown that gas speeds of more than 350 m s$^{-1}$ occur. Owing to the speed of the branched airflow 36, the branched airflow 36 is able to generate thrust. As the airflow 36 is directed at an angle to the main exhaust gas flow, the airflow 36 is able to generate a component of thrust in a different direction to the main thrust produced by the engine. By controlling the height of the baffle 18 and the opening of the outlet 17, the flow of air through the bypass air channel 14, and therefore the flow of air through the outlet 17 can be controlled. In this operating mode a part of the cold air flow is used to generate lift, while the remainder of the cold air flow is used for creating horizontal thrust, as can also be seen from FIG. 1B. The entirety of the flow of hot gas is of course used for the generation of horizontal thrust.

In the following the architecture of a preferred central tube/hot core 12 will be described in more detail. One arrangement of a central tube/hot core 12 is shown in detail in FIG. 3. As can be seen from FIG. 3, the central tube/hot core 12 if formed of four annular sections 38, 40, 42 and 44 that are arranged in series along the longitudinal axis of the module 10. Each of the annular sections 40, 42 and 44 is formed of three segments 46. Each segment 46 extends over a third of the total circumference of the central tube/hot core 12 with gaps 48 being provided adjacent segments 46. These gaps allow for thermal expansion of the segments 46 under the influence of heat. The gaps 48 provided upstream of the central tube/hot core 12 are wider than gaps provided further downstream. This is advantageous as an increased amount of expansion of the segments 46 occurs upstream of the central tube/hot core 12 than downstream due to the higher temperatures upstream. The upstream section 38 is fixedly secured in place. A spring loaded end cap (not shown) is provided downstream of section 44 to restrict downstream longitudinal movement of the sections 38, 40, 42 and 44. The spring loading of this end cap allows for thermal expansion of the sections 38, 40, 42 and 44 in the longitudinal direction.

The segments 46 are held in place by the brackets 30 discussed above with reference to FIG. 1D. The use of these brackets 30 and the presence of gaps 48 allows easy removal and replacement of a segment 46 in case of damage to the segment.

In a typical module 10, the hot gas flowing inside the central tube/hot core 12 can reach temperatures of 800 Kelvin and flow velocities of more than 350 m s$^{-1}$. Ferrite fibre that have been found to provide good performance under these conditions are fibres made of stainless steel SS 304 and/or SS 434 having a mean fibre length of between 300 and 600 μm and a fibre length to diameter ratio of between 6 and 12 and sintered together at a pressure of 0.001 mbar at a temperature of 1100-1250 degrees Centigrade. A sintering time of about 2-3 hours is usually found to be sufficient. Fibers having a mean length of between 300 and 400 μm and a length to diameter ratio of 6 to 7, for example, allow producing a relative density of 25 to 30%. The relative density can be decreased by increasing the mean fiber length and/or by increasing the length to diameter ratio of the fibers. An increase in relative density can be achieved by using shorter fibers and/or fibers that have a lower length to density ratio. To further increase the relative density it is further possible to compress the porous fiber network after sintering. The materials mentioned are, however, only exemplary materials and the use of other materials suitable for withstanding the environmental conditions found in the module 10 is of course also envisaged.

Figure 3:
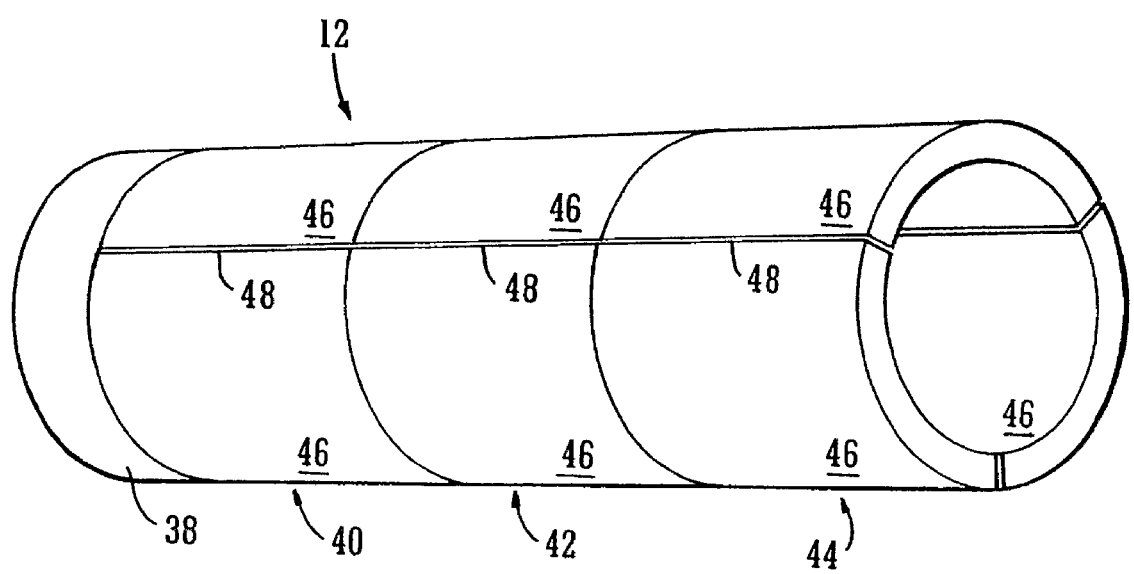
FIG. 3 shows a perspective view of a hot core/central tube in accordance with a preferred embodiment of the present invention.

The porosities of the annular sections 38, 40, 42 and 44 of the embodiment shown in FIG. 3 differ in that the porosity of annular sections located downstream is higher than the porosity of annular sections located further upstream. One way of defining the porosity of the annular sections 38, 40, 42 and 44 is to express their porosity in terms of relative density. The relative density of an object can be calculated by dividing the mass of a volume of the object by the mass of a solid block of the material making up the object, wherein the solid block has the same volume as the volume of the object. One cubic centimetre of SS 304, for example, may weigh 8 grams. The relative density of a section made of SS 304 can be determined by dividing the mass of one cubic centimetre of the section by this value.

In the preferred embodiment shown in FIG. 3, the mass of one cubic centimetre of the section 38 is 7.2 grams and this section can therefore be said to have a relative density of 90%. The masses of one cubic centimetre of the sections 40, 42 and 44 are 4.8 gram, 3.2 gram and 2.4 gram respectively. These sections can therefore be said to have relative densities of 60%, 40% and 30% respectively.

The relative density of a section can, for example, be adjusted by an appropriate choice of the fibre dimensions. A relative density of 25-30% can, for example, be achieved by sintering fibres having a mean fibre length of between 300 to 400 μm and a ratio of fibre length to fibre diameter of about 6 or 7. Lower relative densities can be achieved by choosing longer fibres and/or higher ratios between fibre length and fibre diameter. Higher relative densities can be achieved by choosing shorter fibres and/or lower ratios between fibre length and fibre diameter. The relative density of the sintered fibre material can, for example, be further increased by compressing the sintered fibre material so as to induce plastic deformation.

It can be seen from FIGS. 1B and 1C that the section 38, that is the section with the lowest porosity extents across and further downstream than the opening 17. Only a limited amount of hot air can thus flow from the inside of the central tube/hot core 12 into the cold air flow annulus 14 at the upstream end of the central tube/hot core 12. The temperature of the air that can be exhausted from the duct 32 is thus not significantly increased due to intermixing of the cold bypass air with the hot air from the core engine. This protects objects that come into contact with the air flow exhausted from the duct 32 from heat damage. In an alternative arrangement section 38 is not formed of fibrous material but is instead formed of a solid material that completely prevents the flow of hot gas into the bypass flow annulus.

The porous nature of the central tube/hot core 12 gives rise to a number of advantages. Parts of the hot and cold gas flows inside and outside of the central tube/hot core 12 can, for example, cross the wall of the central tube/hot core 12 with increasing ease as they progress further downstream due to the increasing porosity of the central tube/hot core 12. This allows for intermixing of the gases and thus for a reduction in the disparity in the temperatures of the hot and cold gases. This effect is of course further aided by the good temperature conductivity of the material making up the central tube/hot core 12.

The temperature conditions found in the module 10, that is a module comprising a porous central tube/hot core 12, and the temperature conditions found in a module of equivalent dimension but using a smooth non-porous hot core were determined using computer simulation. Both modules were evaluated in the operating state in which the closure 17 is closed and the baffle 18 is lowered. The highest temperature is found in modules in the central part of the hot air flow that is spaced apart from the hot core. The length and diameter of this hottest part of the hot air flow that extends downstream/ outside of the nozzle 19 was found to be considerably reduced when the porous hot core is used. The maximum temperature of the air exhausted from the nozzle 19 of the module 10 using a porous central tube/hot core 12 is reduced by 30 to 40 Kelvin when compared to the maximum temperature exhausted by a module using a non-porous hot core. This corresponds to a reduction in temperature of up to 5%. At the same time the temperature of the bypass air flow is of course increased due to heat being conducted through the wall of the central tube/ hot core 12 and due to interchange of hot and cold gas flows across the wall of the central tube/hot core 12.

As discussed in the background sections sudden contact of the hot air exhausted from the module 10 with cold air causes a rapid expansion of the cold air and thus an increase in the noise level generated by the combination of the engine and the module 10. As discussed above, the temperature of the hot gas exhausted by a module 10 using a porous central tube/hot core 12, for example the central tube/hot core 12 shown in FIG. 3, is reduced. Because of this reduction in maximum temperature the discrepancy in temperature between the hot gas flow and the cold air flow is reduced. The expansion of the cold air flow when coming into contact with the hot air flow is thus less rapid. The expansion of the cold ambient air when coming into contact with the exhausted gas is also less rapid and the overall amount of noise generated by the module 10 using the porous central tube/hot core 12 is thus reduced. A further reduction in the maximum temperature of the exhaust gas that comes into contact with the ambient air can be achieved by providing a mixer, such as a mixer commonly used in aircraft engines, downstream of the central tube/hot core 12 to mix the hot and cold gas flows.

It has further been found that the use of a porous central tube/hot core 12 in the module 10 provides an advantageous amount of attenuation of the noise generated by the engine that would in the absence of the porous central tube/hot core 12 be transmitted from the inside of the central tube/hot core 12 to its outside. In an experiments noise representative of engine noise that would be encountered in the module 10 was introduced into the upstream end of the central tube/hot core 12. It was found that the central tube/hot core 12 attenuates the noise intensity of this noise by up to 10 dB. This 10 dB reduction in noise of course corresponds to a 50% reduction in the amount of noise transmitted to the outside of the central tube/hot core 12. It will be appreciated that this reduction is significant.

A further advantage arising from the use of a porous central tube/hot core 12 is that, when the baffle 18 is raised the cold air can pass around the baffle 18 in a rapid fashion and at least partially flow into the central tube/hot core 12. This is not possible when a non-porous central tube is used and in this case the cold bypass air is deflected by the baffle 18 and flows around the central tube/hot core 12. A deflected air flow flowing around the central tube/hot core 12 in one direction meets a further deflected air flow flowing around the central tube/hot core 12 in the other direction at a position downstream and diametrically opposite of the baffle 18. Computer simulations have shown that this may lead to air flowing at supersonic speed diametrically opposite of the baffle 18. This may give rise to stability problems which are avoided by the porous central tube/hot core 12 of the preferred embodiment.

The flow velocities found in the module 10, that is a module comprising a porous central tube/hot core 12, the temperature conditions of a module of equivalent dimension but using a smooth non-porous hot core were determined using computer simulation. Both modules were again evaluated in the operating state in which the closure 17 is closed and the baffle 18 is lowered. The maximum gas flow speed in the annulus 14 of the module comprising the non-porous central tube/hot core 12 is $336$ m s$^{-1}$ and occurs diametrically opposite and somewhat downstream of the baffle 18. The maximum gas flow speed in the module comprising the porous hot core occurs at approximately the same location but is only $310$ m s$^{-1}$, that is about 8% lower than the maximum air flow speed encountered in a module using a non-porous hot core.

The module 10 described with relation to FIGS. 1A to 1C has an overall length of 2.8 m. The outer casing part 28 has an outer diameter of 52 cm. The central tube/hot core 12 has an outer diameter of 39 cm, and is 32 mm thick. The spacing between the outer surface of the central tube/hot core 12 and the inner surface of the outer casing part 28 is about 1.2 cm. The hot core extends rearwardly over 1.7 m measured from the front face of cap 20. Each of the annular sections 40, 42 and 44 is about 37 cm long. The annular section 38 has a length of about 14 cm. Each segment 46 extends over 120 degrees of the total circumference of the central tube/hot core 12.

In the module 10 the opening 17 is located about 30 cm downstream of the front face of the cap 20 and the baffles 18 are centred about 105 cm downstream of the front face of cap 20. Petals 34 having a length of about 170 mm have been found to provide a satisfactory pressure build up in the cold air flow annulus 14. The baffle 18 extends around a quarter of the circumference of the cold air bypass channel 14. The duct 32 has a diameter of about 19 cm and is angled in a backward direction by 10 degrees from the vertical direction.

Figure 4:
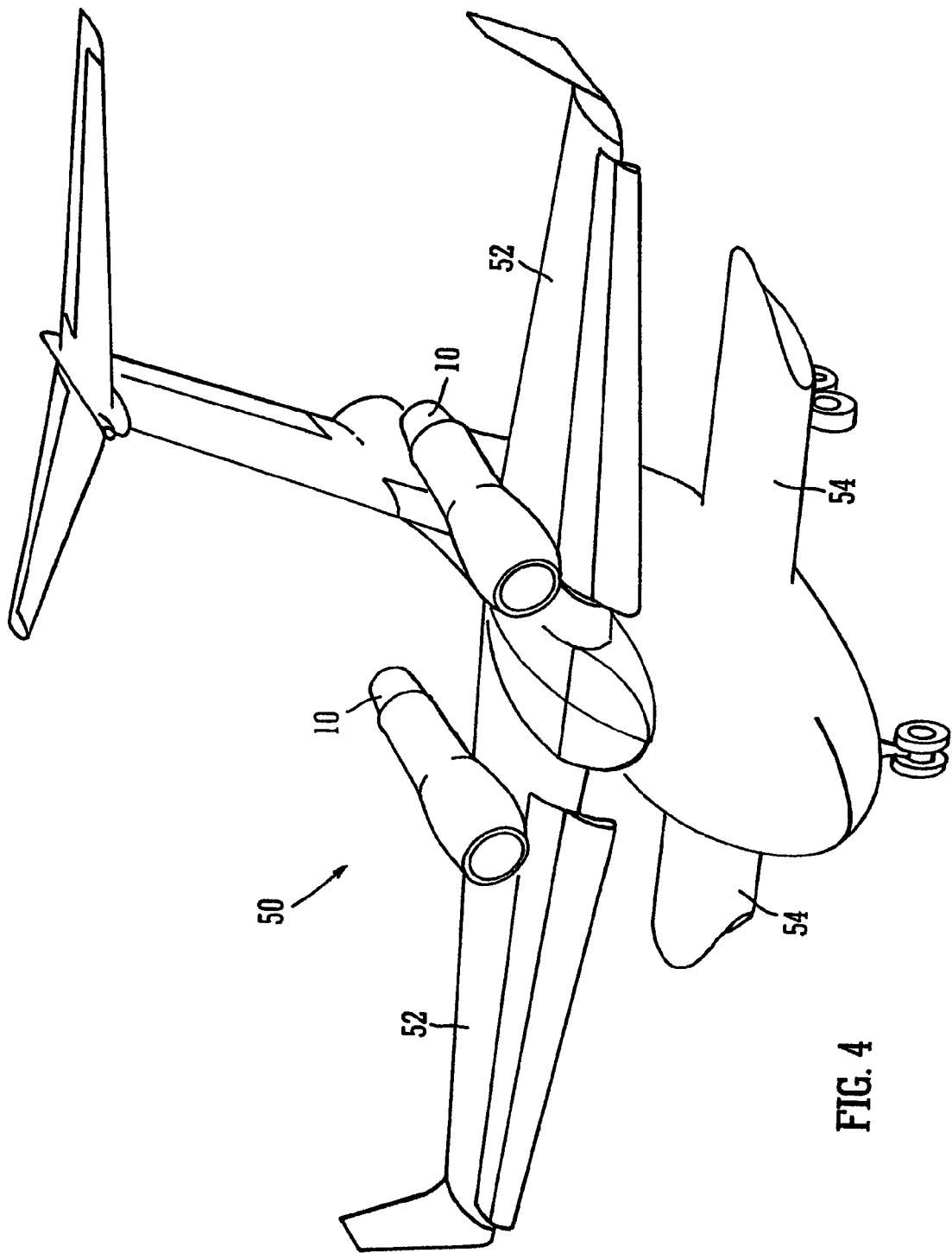
FIG. 4 shows a diagram of a preferred aircraft incorporating the engine of the present invention.

Turning now to the way the engine and module 10 are arranged on an aircraft 50, as shown in FIG. 4, in a preferred example two engines are provided on the aircraft 50, one engine being provided on or under each wing of the aircraft, and being arranged symmetrically with respect to the centre axis of the aircraft 50. By mounting the engines symmetrically in this way tipping or twisting of the aircraft during use is avoided.

In the case of over wing mounted engines, the outlet 17 of each of the modules is connected to a duct that passes through the wing on which the engine is mounted. In this way, when the outlet 17 is opened and a portion of the bypass air is directed through the opening 17, the jet of re-directed bypass air 36 is able to pass through the wings and generally vertically downwards. In this case, it is preferred that the outlet 17 exhausts to a duct which ends with one or more nozzles, such as nozzle 23, on the underside of the wing through which the airflow is directed. When the engine is mounted under the wing, the outlet 17 may be provided with one or more nozzles that are directed generally downwardly.

In use, when the aircraft is to take off, the baffles 18 are raised and the iris is opened to open the outlet 17. In this way, the hot gas exhausted from the engine, and a proportion of the cold bypass air is jetted from the rear of the engine to provide forward thrust, while a portion of the cold bypass air is directed through the outlet 17 and the ducting 32 in the underside of the wings or engines to provide an element of vertical thrust. This element of vertical thrust will assist the take off of the aircraft, allowing the aircraft to take off at a lower velocity and therefore requiring a shorter runway. When the aircraft is airborne, the baffles 18 can be lowered and the outlet 17 closed by closing the iris. In this way, all of the available thrust from the hot and cold air is jetted from the rear of the module, and therefore provides forward thrust.

The total lift achieved by an aircraft depends on a number of factors. One of these factors is of course the horizontal speed of the aircraft. A further factor is the design of the airfoils of the aircraft. The aircraft 50 illustrated in FIG. 4 comprises two main wings 52 to each of which one engine/module 10 is fitted and a pair of second wings or airfoils 54. These airfoils 54 are arranged below the main wings 52 and slightly set back from the centres of the main wings 52, as can be seen from FIGS. 5A, 5B, 6A and 6B. The engines and the modules 10 are mounted on top of the main wings 52 and the duct (not shown) of the modules 10 extends through the main wings 52, so that a part of the bypass air flow can be exhausted to the areas below the main wings 52.

Figure 5A:
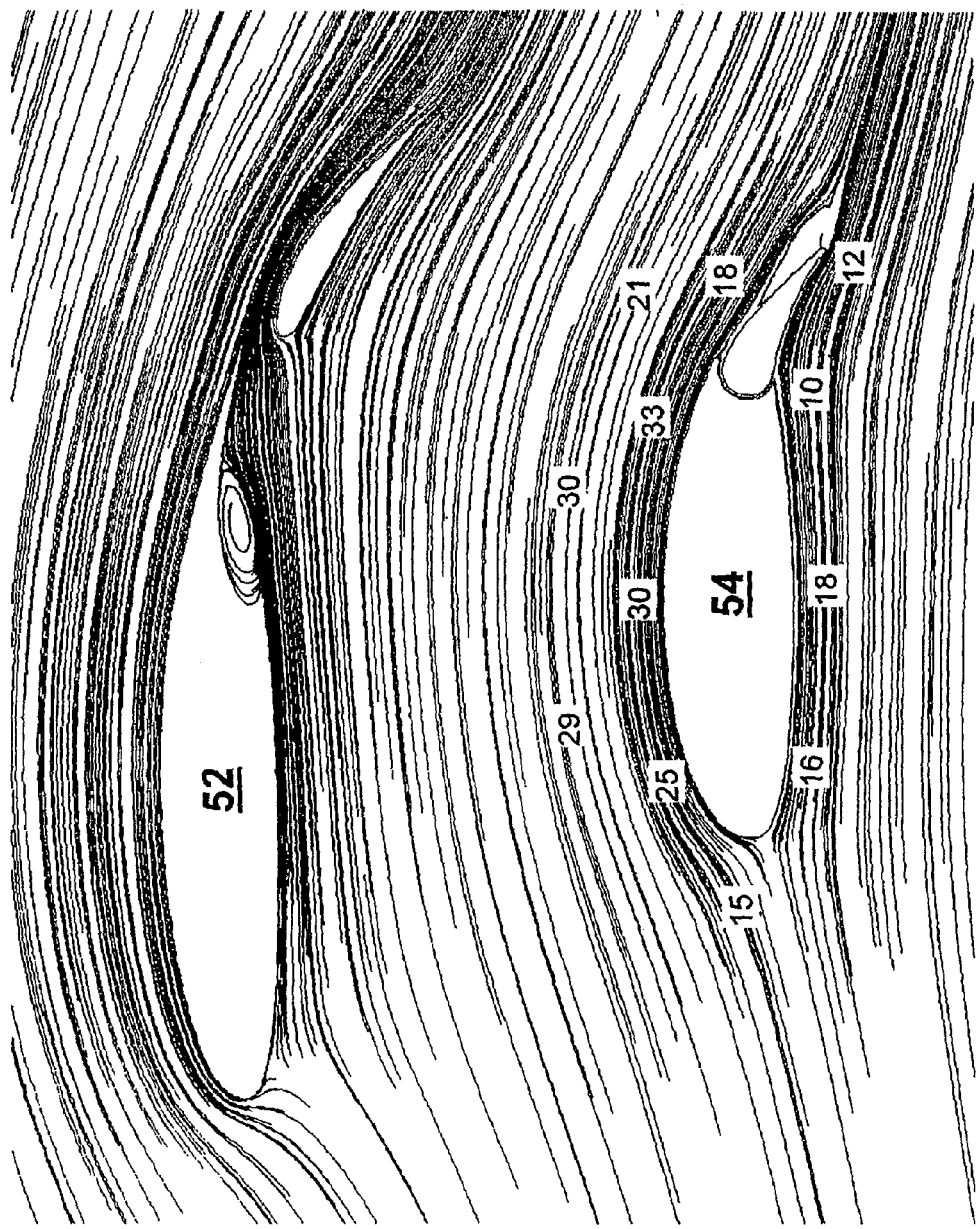
FIG. 5A shows a velocity distribution about the wings of the aircraft shown in FIG. 4 in an operational mode in which no bypass air flow is exhausted in the downward direction.
Figure 5B:
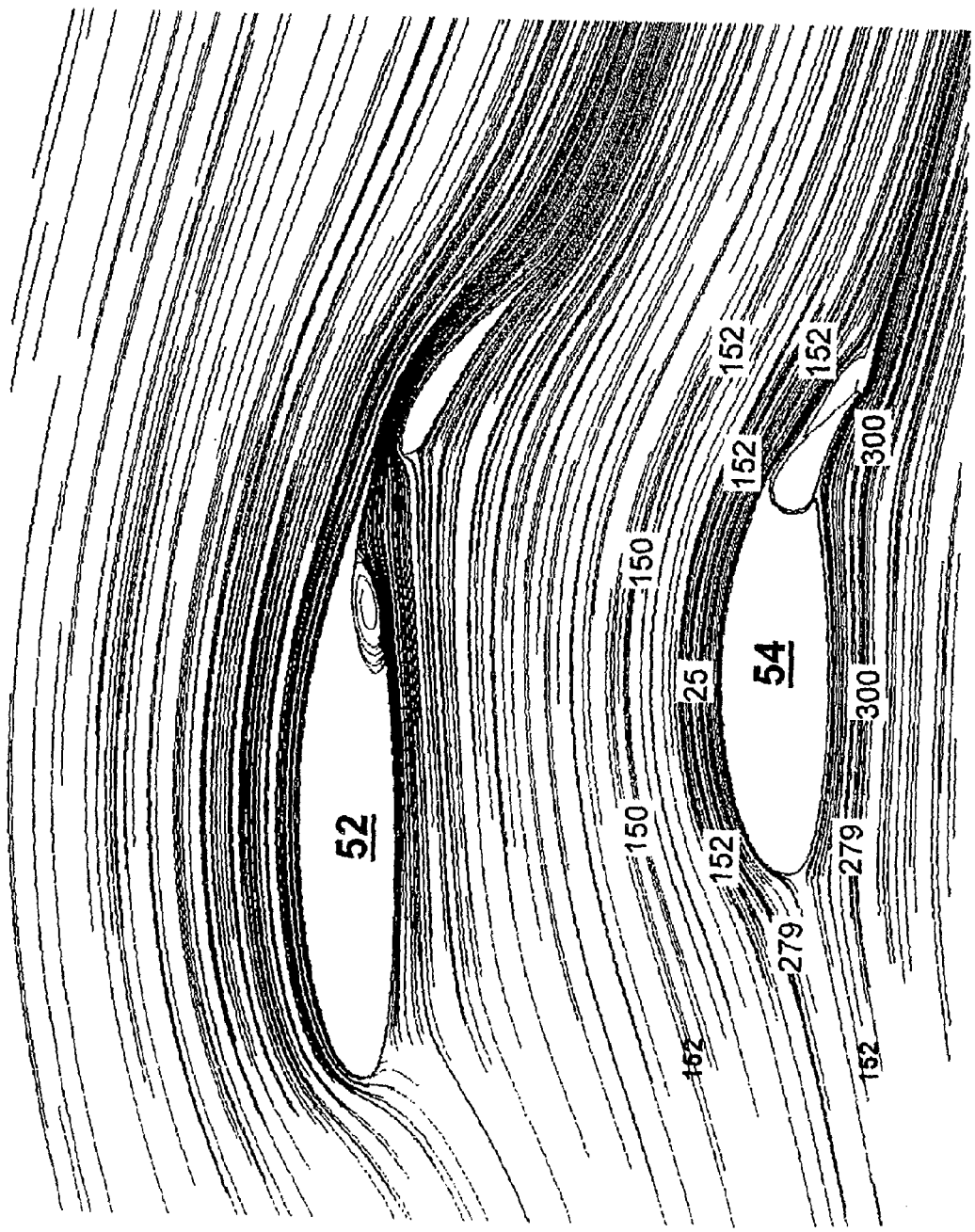
FIG. 5B shows a pressure distribution about the wings of the aircraft shown in FIG. 4 in an operational mode in which no bypass air flow is exhausted in the downward direction.

FIGS. 5A and 5B illustrate the aircraft 50 in an operational mode in which no bypass air flow is exhausted in the downward direction. The numbers surrounding the airfoil 54 in FIG. 5A are flow velocities in m s$^{-1}$ and may be achieved during take off at 50 knots. The numbers surrounding the airfoil 54 in FIG. 5B are pressure values in Pascal measured relative to the surrounding atmospheric pressure. The illustrated airfoil 54 has a lift coefficient of 0.48.

Figure 6B:
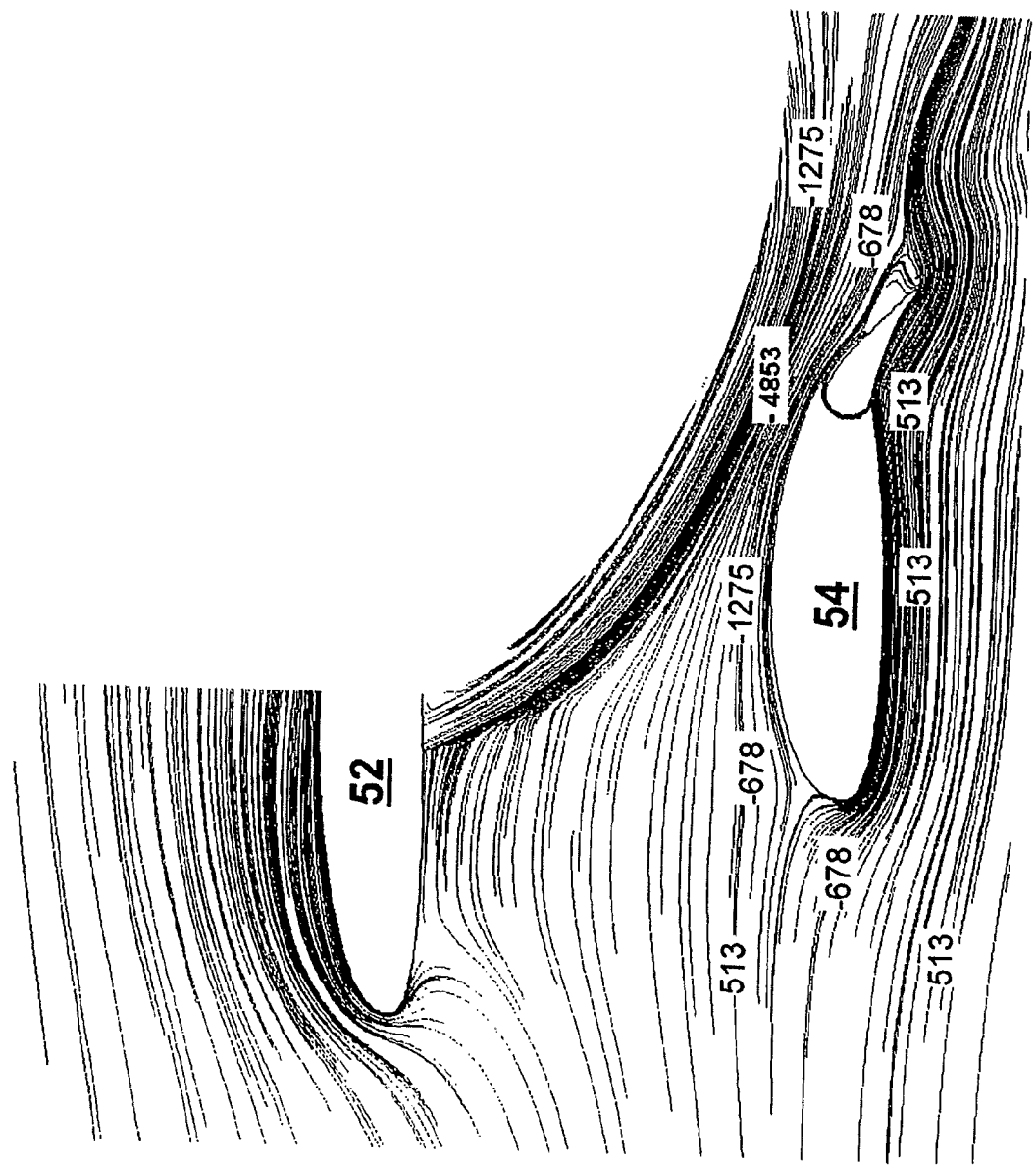
FIG. 6B shows a pressure distribution about the wings of the aircraft shown in FIG. 4 in a further operational mode in which bypass air flow is exhausted in the downward direction.

FIGS. 6A and 6B illustrate the aircraft 50 in an operational mode in which bypass air flow is exhausted in the downward direction through the duct 32 of the module 10 and through the wing 52. The numbers surrounding the airfoil 54 in FIG. 6A are again air flow velocities in m s$^{-1}$. As can be seen, the flow velocity of the air exhausted from the module 10 is considerably higher than the velocity of air flow that is due to the horizontal movement of the aircraft. The jet of air exhausted from the module 10 is directed towards the downstream part of the airfoil 54. It can further be seen from a comparison of FIGS. 5A and 6A that the air speed at the centre of the upper surface of the airfoil 54 increases from 30 m s$^{-1}$ to 40 m s$^{-1}$ when the jet of air from the module 10 is provided. This is due to entrainment or the drawing in/acceleration of the horizontal air flow over the airfoil 54 by the jet of air exhausted from the module 10.

FIG. 6B shows the pressure distribution about the airfoil 54. The numbers surrounding the airfoil 54 in this figure are again pressure values in Pascal measured relative to the surrounding atmospheric pressure. As can clearly be seen the difference in the air pressures above and below the airfoil 54 is markedly increased when compared to the pressure distribution of FIG. 5B. This increase in pressure difference manifests itself in an increase of lift obtained from the airfoil 54 and the lift coefficient achieved with the airfoil is 1.940 in the configuration shown in FIGS. 6A and 6B. By directing the jet of air from the module 10 so that it impinges on a part of the lower airfoil 54, preferably on a downstream part of this airfoil 54 and even more preferably towards the downstream edge of or the downstream flap associated with the airfoil 54, an increase in lift coefficient of more than 300% was thus achieved. The jet of air provided by the module 10 thus not only provides an element of vertical thrust when being exhausted from duct 32 under the wing 52 but further serves to enhance the lift obtained from the airfoil 54.

The wings 52 shown in FIGS. 5A, 5B, 6A and 6B has a horizontal depth/chord length of 3.8 m and a thickness to chord ratio of 15%. The wing 52 has an incidence of 2 degrees and the flap associated with the wing 52 is a 35 degree single slotted fowler flap. The airfoil 54 has a depth/chord length of 3 m and a thickness to chord ratio of 21%. The airfoil 54 has an incidence of 2 degrees and the flap associated with the airfoil 54 is a 20 degree plain flap. The upper surface of the wing 52 is vertically spaced from the upper surface of the airfoil 54 by 2 m and the leading edge of the airfoil 54 is set back by 1.4 m from the leading edge of the wing 52. The angle at which the air is exhausted out of the duct 32 is 25 degrees.

Figure 7:
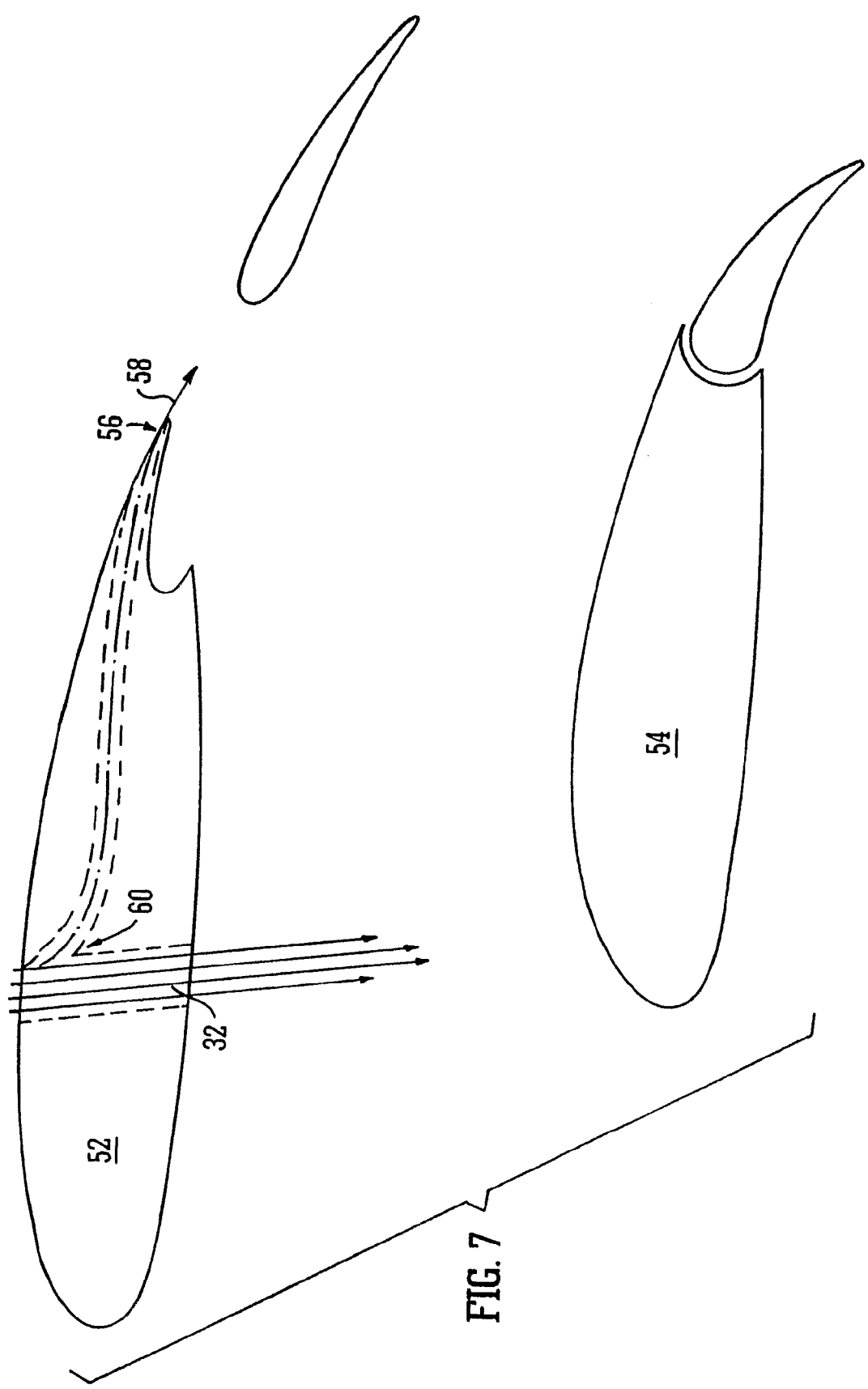
FIG. 7 shows an arrangement in which part of the cold air flow is directed over the upper wing of the aircraft shown in FIG. 4.

In the embodiment shown in FIG. 7 a small part 58 of the air flow exhausted through the duct 32 from the module 10 is taken from the air flow so that it is not exhausted downwardly towards the airfoil 54. Instead, this part of the air flow is exhausted through an opening 56 in the upper surface of wing 52 in a manner that increases the air speed above the wing 52. This increase in air speed increases the amount of lift obtained from the wing 52. The part of the air flow may be taken from the duct 32 by providing a T-junction 60 in duct 32 that allows the bleeding off of a small amount of the air flow. The nominal jetted air flow 56 can compensate for small irregularities in the airflow along the downstream part of the lower surface of the wing 52 caused by suction through the gap between the trailing edge of the wing 52 and the leading edge of the flap attached to the wing 52.

Turning now to the operation of the aircraft 50, the aircraft 50 can, for example be operated during take off by accelerating the aircraft to a horizontal speed in which the horizontal flow of air caused by the rolling of the aircraft provides an amount of lift. In this first phase of take off all of the cold bypass air flow is used to generate horizontal thrust. Once a predetermined speed is achieved the baffle 18 of the module 10 is raised and the opening 17 is opened so that part of the cold bypass air flow is exhausted through the duct 32, thereby creating further vertical lift and causing the aircraft to lose contact with the ground, rather than having to create this further lift by accelerating further on the runway and thus requiring a significantly longer runway. Preferably the baffle 18 is raised while the opening 17 is being opened. Once the aircraft is airborne the landing gear is retracted, causing a reduction in drag and thus a further acceleration of the aircraft. Once the aircraft has gained sufficient height the baffle 18 is lowered and the opening 17 closed so that all of the cold air bypass flow is again used for creating horizontal thrust.

It is preferred that, once the predetermined speed or the predetermined lift is achieved, the baffle 18 is raised in a rapid fashion and the opening 17 is also opened quickly. In the preferred embodiment the baffle 18 is raised on the opening 17 is opened in less than three seconds. Doing so will provide an immediate impulse of vertical thrust before the reduction in horizontal thrust caused by the re-directing of the part of the cold bypass air into duct 32 reduces the degree of horizontal acceleration of the aircraft. This impulse, if applied at the correct moment, will cause the aircraft to become airborne.

The total thrust provided by the engines can be automatically or manually increased to compensate for the decrease in horizontal thrust caused by the redirecting of bypass air. The total horizontal acceleration of the aircraft thus remains unaltered. It may be that, if the overall thrust provided by the engines is not increased when the vertical thrust pulse is created, the aircraft could decelerate due to drag and ground friction forces acting on the aircraft. The vertical thrust pulse created by the re-directing of bypass air creates an instant acceleration component in the vertical direction as, at the time at which this thrust component is generated, the weight of the aircraft is almost completely balanced or compensated for by the lift created by the horizontal movement of the aircraft.

Measure to reduce drag of the aircraft as described above can then be implemented to compensate for any reduction in horizontal acceleration that may be caused by the re-directing of the portion 36 of the cold bypass air flow. Once a positive rate of incline is achieved by the aircraft the re-directed bypass airflow 36 used for generating vertical thrust can be allowed to again be exhausted from the downstream end of the module 10.

The efficiency and operation of an aircraft using an engine according to the present invention has been determined computationally, and indicates that the use of less than 15% of the available bypass thrust from an engine would enable an aircraft to take off from a runway of less than 125 m.

The exact length of runway required for an aircraft using the module 10 to become airborne of course depends on a variety of factors, such as, for example, the ambient temperature, the local wind velocity, the pressure altitude and the density altitude at which the runway is located. From such factors the speed at which the aircraft can become airborne with the assistance of the vertical air jet can be determined while the aircraft is stationary on the runway. The pilot can thus be provided with an estimate of the length of runway required for takeoff and of the correct point in time at which to initiate the vertical air jet. This point in time coincides with the latest decision point at which take-off can be aborted safely in order to stop the aircraft within the prescribed emergency stopping distance. As the decision point to take-off or abort is located considerably closer to the end of the runway at which the take-off procedure is commenced the total length of the runway is considerably reduced when compared to runways suitable for the take-off and landing of conventional aircraft.

The downwardly directed bypass airflow 36 can also be used to reduce the distance in which an aircraft can come to a halt during landing or reduce the braking force that needs to be applied during the landing procedure. Shortly before the aircraft touches the ground during landing the iris can again be opened to open the outlet 17 and the baffle 18 raised to cause a portion of the cold air to flow through the outlet 17. At the same time lift is created by the re-directed air flow 36. This allows the pilot to reduce the speed of the aircraft and it may be possible to fly the aircraft at a speed that is below the normal stalling speed the same aircraft has when the air flow 36 is not re-directed. The re-directing of the air flow 36 thus reduces the stalling speed of the aircraft. After the aircraft has made contact with the ground a routine braking procedure can be used to bring the aircraft to a halt. As the aircraft already has a reduced speed at the beginning of this routine braking procedure the aircraft can land in a shorter distance than would otherwise be the case.

The aircraft 50 is arranged so that, in the case of the failure of one of the engines the remaining operable engine will automatically sense the reduction in power provided by the failing or failed engine and operation of the mechanism redirecting the bypass air flow is prevented.

It will be appreciated that whilst the module has been described separately from the engine itself, the module may be formed integrally with the engine.

The factors affecting the take off capabilities of an aircraft include the lift, weight, thrust, drag and rolling friction forces that will act on the aircraft. The lift and drag forces are dependent on the design of the aircraft itself, and can be estimated using Prandtl-Lanchester's lifting line theory. Using this theory, an example of the parameters for an aircraft according to the present invention have been determined as set out below.

The lift and drag forces result from aerodynamic and non-aerodynamic characteristics of an aircraft, summarised by the coefficients of lift and drag. The following examples have employed initial estimates for these important coefficients, based both on an elliptic distribution of circulation over the wing of the modelled aircraft and available data on parasite drag experienced by wings and bluff bodies. These estimates feature in these preliminary results because of a chief objective to determine the take-off capabilities of the modelled aircraft rapidly. It should be noted that increasing the installed thrust of the engines will of course allow for an increase in aircraft size and weight. Therefore, the following example merely sets out to describe existing formulae that can be used in this instance. While generating these accurate magnitudes, this initial study has employed the parameters listed below:

TABLE 1

| Density | $\rho$ | 0.002377 | slugs/ft$^3$ |
|---|---|---|---|
| Acceleration of Gravity | g | 32.2 | ft/s$^2$ |
| Total Weight | W | 6,500 | lbf |
| Coefficient of rolling friction | $\mu$ | 0.02 | |
| Wing Surface Area | S | 255.39 | ft$^2$ |
| Wing Span | b | 37.05 | ft |
| Oswald's Wing efficiency | e | 0.7 | |
| Coefficient of Lift | CL | 1.0 | |
| Coefficient of Parasite Drag | CD$_0$ | 0.030 | |

Comment on the Coefficient of Rolling Friction

For the coefficient of rolling friction, 0.02 has been chosen for the worst condition, namely icy concrete/asphalt. The calculation for a normal condition assuming the coefficient of rolling friction, 0.05 as a typical value (instead of 0.02).

The table below gives ground rolling friction (resistance) coefficients obtained from DANIEL P. RAYMER, "Aircraft Design: A Conceptual Approach", Third Edition, American Institute of Aeronautics and Astronautics Inc., Rexton, Va., 1999.

TABLE 2

| | Typical Values of $\mu$ | |
|---|---|---|
| Type of Runway Surface | Rolling (brakes off, take-off conditions) | Brakes on (landing conditions) |
| Dry concrete/asphalt | 0.03-0.05 | 0.3-0.5 |
| Wet concrete/asphalt | 0.05 | 0.15-0.3 |
| Icy concrete/asphalt | 0.02 | 0.06-0.10 |
| Hard turf | 0.05 | 0.4 |

TABLE 2-continued

| | Typical Values of μ | |
|---|---|---|
| Type of Runway Surface | Rolling (brakes off, take-off conditions) | Brakes on (landing conditions) |
| Firm turf | 0.04 | 0.3 |
| Soft turf | 0.07 | 0.2 |
| Wet grass | 0.08 | 0.2 |

However, EGBERT TORENBEEK, in "Synthesis of Subsonic Airplane Design", Kluwer Academic Publisher, Dordrecht, The Netherlands, 1982, gives the following typical value of μ:

TABLE 3

| Surface | Typical Values of μ |
|---|---|
| Hard runways (concrete, tarmac) | 0.02 |
| Hard turf/gravel | 0.04 |
| Short/dry grass | 0.05 |
| Long grass | 0.10 |
| Soft ground | 0.10 to 0.30 |

As it can be seen, these values are slightly different from Raymer's values. It is better to use the values given in Table 2 in the take-off calculation. They provide results that are more realistic.

Comment on Maximum Lift Coefficient $C_L$=1.0 is used in the early estimation of take-off analysis for the aircraft. The maximum CL that is likely for the modelled aircraft using the empirical formula to estimate takeoff distance based on THOMAS C. CORKE, "Design of Aircraft", Prentice Hall, Pearson Education Inc., NJ, US, 2003, is:

$$S_{to} = 20.9 \left(\frac{W}{S}\right)\left(\frac{1}{C_{L_{max}}}\right)\left(\frac{W}{T}\right) + 87\sqrt{\left(\frac{W}{S}\right)\left(\frac{1}{C_{L_{max}}}\right)} \quad (1)$$

If the aircraft is to take off within a distance of 125 m, the above equation and thrust of 6000 lbf gives $C_{Lmax} \geq 5.4289$.

Experience shows that typically $C_{LTO}$=0.175 $C_{LmaxTO}$ is a good estimation for V/STOL aircraft and therefore $C_{LTO}$=0.95 will be acceptable for $C_{Lmax}$=5.4289 or alternatively, the value of $C_{Lmax}$=5.714 is suggested for the assumed value of $C_{LTO}$=0.1.

Comment on Oswald's Wing Efficiency

It is not necessary to assume the value of Oswald's Wing efficiency and it can be calculated using the 'Leading-Edge Suction Method'. Otherwise the error will be very high on the induced-drag calculation in general and the induced-lift drag coefficient in particular.

Oswald efficiency factor mainly depends on the wing characteristics. At low lift coefficients with elliptical lift distributions, ε of the wing tends to unity. At high $C_L$, M and the jet deflection $δ_v$, the drag polar does not have a parabolic behaviour since the flow separation strongly affects the lift distributions on the lifting surfaces.

Several semi-empirical equations to estimate K and the spanwise lift distribution have been developed over the years, such as those by Eppler (1997), Lam (1993), Raymer (1992), Rokhsaz (1993), Lowson (1990), Roskam (Part-6 1987), Covert (1985), Nicolai (1984), Butler (1983), Stinton (1983), Torenbeek (1982) and Laitone (1978).

One of the methods which can predict ε better than other estimation methods, is called the 'leading-edge suction method' (e.g., Raymer 1992, Roskam Part-6 1987 and Covert 1985). It is briefly formulated as $$\varepsilon = \left[\frac{\pi AR}{C_{L_\alpha}}(1-\chi)+\chi\right]^{-1}$$

where χ is called the leading-edge suction factor. For fully attached flow or full leading-edge suction χ=1 and for fully separated flow or zero leading-edge suction χ=0. This parameter depends on the camber, the leading-edge radius, the sweep-back angle Λ and the Re of the aerodynamic surfaces. Although the three-dimensional calculation of χ is complicated and needs CFD techniques, it can be estimated from the DATCOM's (data compendium from the USAF) or Raymer's semi-empirical methods for the conceptual design. For a typical lifting surface of civil jet aircraft at cruise conditions, χ is usually of order 0.9 to 0.95 and at take-off conditions, χ is of order 0.7.

Jet deflections change the lift distribution on the aerodynamic surfaces and the local M, and therefore will affect ε and K. One of the first semi-empirical methods to investigate the reduction of wing induced-drag factor due to thrust-vectoring was presented by Maskell & Spence (1959) and then modified by Capone (1975). The relation between $δ_V$, local M and local $C_L$ must be known to make it possible to theoretically evaluate the thrust-vectoring effects on K. Therefore, these effects cannot be formulated easily and they will be estimated using the results of experiment, CFD or of the Vortex Lattice Method (VLM).

After comparing different values of Oswald's efficiency factor from several methods of Cavallo (1966), Raymer (1989) and Roskam (1987) with the actual aircraft values, the following equation based upon the statistical data for is now suggested:

$$\varepsilon = [0.0045(AR)^{0.68}-0.1]\cos\Lambda_{leading-edge} + \frac{165}{\left(\frac{\pi AR}{C_{L_\alpha}}\right)+9} - 10.3$$

Recent V/STOL aircraft are designed to have bigger Oswald's efficiency factor and smaller $C_{D_0}$. For a V/STOL subsonic aircraft, the lift curve slope, $C_{L_\alpha}$ (per radian) is (Raymer 1999, modified version of equation from Lowry & Polhamus, 1957)

$$C_{L_\alpha} = \frac{2\pi AR}{2+\sqrt{4+\left[\frac{AR(1-M^2)}{0.95}\right]^2 \cdot \left[1+\frac{\tan^2\Lambda_{maxt}}{1-M^2}\right]}} \left(\frac{S_{exposed}}{S_{reference}}\right)\left[1.07\left(1+\frac{d_F}{b_F}\right)^2\right]$$

$\Lambda_{maxt}$ is the wing swept at the maximum thickness location. $d_F$ is the average diameter of the fuselage. $S_{exposed}$ is the exposed wing platform which is the reference area of wing minus the part of the wing area covered by the fuselage.

Governing Equations

The wing aspect ratio and total coefficient of drag have been calculated using the formulae $$AR = \frac{b^2}{S}, \quad C_D = C_{D_0} + \frac{C_L^2}{\pi A R e} \tag{2}$$

Denoting with V the forward speed, the lift and drag forces are then expressed as $$L = \frac{\rho}{2} V^2 S C_L, \quad D = \frac{\rho}{2} V^2 S C_D \tag{3}$$

Comment on the Equation for Drag Coefficient Calculation

The equation $C_D$ can be calculated in another way.

JOHN D. ANDERSON JR., in "Aircraft Performance and Design", McGraw Hill, Singapore, 1999, gives $$C_D = C_{Do} + \Delta C_{D0} + (k_1 + G k_3) C_L^2 \tag{4}$$

where $C_{Do}$ is related to the conventional flight drag polar at cruise conditions and $$\Delta C_{Do} = \frac{W}{S} K_{uc} m^{-0.215} \tag{5}$$

Factor $K_{uc}$ depends on the amount of flap deflection and its consequences on the landing gear drag. Typical values for $K_{uc}$ are $K_{uc} = 5.81 \times 10^{-5}$ for zero flap deflection $K_{uc} = 3.16 \times 10^{-5}$ for maximum flap deflection Parameter G in eq. (4) indicates the effect accounted for the ground effect and can be calculated from $$G = \frac{C_{Di}(\text{in-ground-effect})}{C_{Do}(\text{out-of-ground-effect})} = \frac{(16h/b)^2}{1 + (16h/b)^2} \tag{6}$$

where h is the average height of the wing above the ground and b is the wingspan.

$k_1$ in eq. (4) is proportionality constant for increment of parasite drag due to lift, $C_{Di}$. Similarly, $k_3$ is proportionality constant for increment of induced drag due to lift.

Corke's Method Provides:

$$C_D = C_{Do} + k C_{L(G)}^2 + \Delta C_{Do(flap)} + \Delta C_{Do(LG)} \tag{7}$$

where $C_{Do}$ is related to the conventional flight drag polar at cruise conditions. $\Delta C_{Do(flap)}$ is the increase in $C_{Do}$ due to flaps (named as 'added base drag due to flaps' by Corke) and the typical values are given below:

TABLE 4

| Flap Type (the flap span is 60% of wing span and the flap chord is 25% of wing mean aerodynamic chord) | $\delta_f$ | $\Delta C_{Do(flap)}$ |
|---|---|---|
| Fowler | 30 | 0.032 |
| Fowler | 50 | 0.083 |
| Split/Plain | 30 | 0.05 |
| Split/Plain | 50 | 0.10 |
| Slotted | 30 | 0.02 |
| Slotted | 50 | 0.05 |

The added-base drag due to landing gear retraction at ground roll is $$\Delta C_{Do(LG)} = f_{LG} \frac{A_{LG}}{S} \tag{8}$$

where $A_{LG}$ is the frontal area of the landing gear while $f_{LG}$ is the correlation function that is based on the gross take off weight of the aircraft.

$$f_{LG} = 3.23 \sqrt{\frac{W_{TO}}{1000}} \tag{9}$$

$C_{L(G)}$ is the lift coefficient due to the ground effect. The ground effect increases the effective L/D of the aircraft at take-off and also can decrease the lift-induced drag. In this case, the effective aspect ratio of the wing becomes larger and can be estimated from $$\frac{A}{A_{eff}} = \sqrt{\frac{2H}{b}} \tag{10}$$

According to Raymer's Method the drag due to lift, $kC_L^2$ can be reduced due to ground effects. This is the result of a reduction in the induced downwash angle and can be visualized as a trapping of a 'cushion of air under the wing'. The effective $C_{Di}$ can be calculated by $$G = \frac{(C_{Di})_{eff}}{(C_{Di})} = \frac{33(h/b)^{1.5}}{1 + 33(h/b)^{1.5}} \tag{11}$$

where $\Delta C_{Do}$ in eq. (5) suggested by Anderson may be suitable for the first estimation of this parameter (as the equation does not require the dimensions of the landing gear and flap configuration).

Probably, a combination of these three methods described above can be used to calculate the $C_D$ of the aircraft more accurately after some modifications.

$$C_D = C_{Do} + \Delta C_{Do(flap)} + \Delta C_{Do(LG)} + G k C_L^2 \tag{12}$$

where $C_{Do}$ is the zero-lift coefficient at cruise conditions. $\Delta C_{Do(flap)}$ is estimated using Table 4 and $\Delta C_{Do(LG)}$ is from eq. (8) and G is from eq. (11).

Comment on Induced-Drag Coefficient

The induced-drag coefficient of the reference aircraft is presented in the following form which includes the effects of the trim and vortex interference (Torenbeek 1982, Laitone 1978 and Lutze 1977):

$$C_{Di} = K_b C_{Lb}^2 + K_h \frac{S_h}{S} C_{Lh}^2 - 2K_{int} \frac{S_h}{S} C_{Lb} C_{Lh} \quad (1)$$

and this relation should be modified for the vectored aircraft to $$C_{Di,v} = K_{b,v} C_{Lb,v}^2 + K_{h,v} \frac{S_h}{S} C_{Lh,v}^2 - 2K_{int,v} \frac{S_h}{S} C_{Lb,v} C_{Lh,v} \quad (2)$$

Subscript v refers to the V/STOL (vectored) aircraft compared to the unvectored reference aircraft. The first two terms on the right-hand side of eqs. (1) & (2) are purely related to the body and tail. The last term corrects the induced drag coefficient to account for the interference effects. For simplification, the term $K_h$ in eq. (1) may be determined by treating the horizontal tail as a smaller wing (Raymer 1992), but experimental or computational studies need to be done to estimate $K_{h,V}$ in eq. (2). However, the induced-drag coefficient of a conventional tail is much smaller than the one for a swept wing.

The terms in the above equations are considered here separately. The induced drag coefficient of the body (i.e., wing, fuselage, nacelles) of the unvectored jet aircraft is composed of three main parts;

$$K_b C_{Lb}^2 = K_w C_{Lw}^2 + K_{fus} C_{Lfus}^2 + K_n C_{Ln}^2 \quad (3)$$

The last two terms in the above equation are due to the fact that the fuselage and nacelles may generate a small lift when located at an AoA. By using Roskam's method (Part-6 1987) and assuming that the nacelle can be treated as a small fuselage, eq. (3) may be changed to $$K_b C_{Lb}^2 \approx K_W C_{Lw}^2 + \frac{A_{fus}}{S} \alpha^2 + \frac{A_n}{S} (\alpha + \delta_e)^2 \quad (4)$$

where A here is the area normal to the longitudinal axis. Due to neglecting the interference effects caused by the airflow around the wing-fuselage and wing-nacelle regions, eq. (4) cannot be very accurate. In spite of this, by knowing that $K_b$ is mainly based on the wing characteristics, the error involved is not so significant and this equation can still be used in the initial estimation of the body induced drag coefficient for the reference aircraft (unvectored jet). Eq. (4) is modified for the vectored aircraft to the form $$K_{b,v} C_{Lb,v}^2 \approx K_{w,v} C_{Lw,v}^2 + \frac{A_{fus}}{S} \alpha_v^2 + \frac{A_n}{S} (\alpha_v + \delta_e + \delta_v)^2 \quad (5)$$

The interference factors in eqs. (36) & (37) are presented by Goodrich et al (1989) as $$K_{int} = \sigma \sqrt{K_w K_h} \text{ and } K_{int,v} = \sigma \sqrt{K_{w,v} K_{h,v}} \quad (6)$$

where $\sigma$ is called the 'Prandtl coefficient'. Since the effects of thrust-vectoring have been already accounted in the induced-drag factors, $\sigma$ is expected to be independent of jet deflections so that it remains constant between the two aircraft. Prandtl's relation for $\sigma$ is expressed as (Goodrich et al 1989 and Butler 1983)

$$\sigma = \frac{b_h}{b_w} \left[ 1 - \frac{h_{wh}}{b_w} - 2.16 \sqrt{\frac{h_{wh}}{b_w}} \right] \quad (7)$$

where b is the span and $h_{wh}$ is the average vertical gap between the wing and tail. The change of the Oswald efficiency factors may be estimated using the leading-edge suction method and treating the horizontal tail as a small wing. This needs some curve fitting to obtain suitable relations for the leading-edge suction factor from the graphs presented in the DATCOM's or in Raymer's semi-empirical methods.

It is possible to separate the effect of elevator deflection from the tail in the $C_{Di}$ calculation. Also, it is possible to simplify or even neglect the interference terms and derive an equation similar to the one presented by Raymer (1992) or Roskam (Part-6 1987).

For realistic calculations, this study has also employed the actual thrust-forward-velocity equation provided by the engine manufacturer as:

$$T_o = 100a \left( 30 - 2.1997 \left(\frac{V}{100}\right) + 0.1551 \left(\frac{V}{100}\right)^2 \right) \quad (13)$$

This shows that the total thrust decreases slightly with increasing velocity. For the three types of engines employed, and considering an aircraft that uses two engines, the corresponding magnitudes of "a" respectively are: 1) $a=2\times 4.75/6$, 2) $a=2\times 5/6$, and 3) $a=2$ Comment on Engine Thrust Equation It is better to present the engine thrust equation of a V/STOL aircraft in the form of $$T_o = (a_o - a_1 h + a_2 h^2 - a_3 h^3) + (b_o - b_1 h - b_2 h^2 + b_3 h^3) \times (c_o - c_1 M + c_2 M^2 - C_3 M)$$

where $a_o$ to $a_3$, $b_o$ to $b_3$ and $c_o$ to $C_3$ are positive constant coefficients and can be found using a curve-fitting technique.

The total engine thrust is split into two parts, with a part contributing to the forward linear momentum of the aircraft and a portion providing an upward thrust to augment the aerodynamic lift.

$$T_f = T_o - k(V) T_o; T_u = k(V) T_o; L_{tot} = L + T_u \quad (14)$$

where $k=k(V)$ denotes a speed-dependent cubic-spline expression that represents the strategic opening of the downward-jet nozzles. The nozzle opening expression used in this study remains smooth for all velocity magnitudes, which induces a smooth variation of total lift, as detailed in the Results section. The maximum $k_{max}$ of k is a parameter that corresponds to a percentage of the total thrust. As expected the amount of needed augmentation upward thrust rapidly decreases as the available maximum forward thrust increases. In respect of the closing modality of the nozzles, if they are closed too rapidly, the total lift may drop below the aircraft weight and the climb speed will start decreasing; if they are closed too slowly the forward thrust remains limited. A practical expression for $k=k(V)$ that avoids either extreme, may be expressed as: $k>=(W-L)/T_o$.

The rolling resistance R, $$R = \mu(W - L_{tot}) \quad (15)$$

Figure 8:
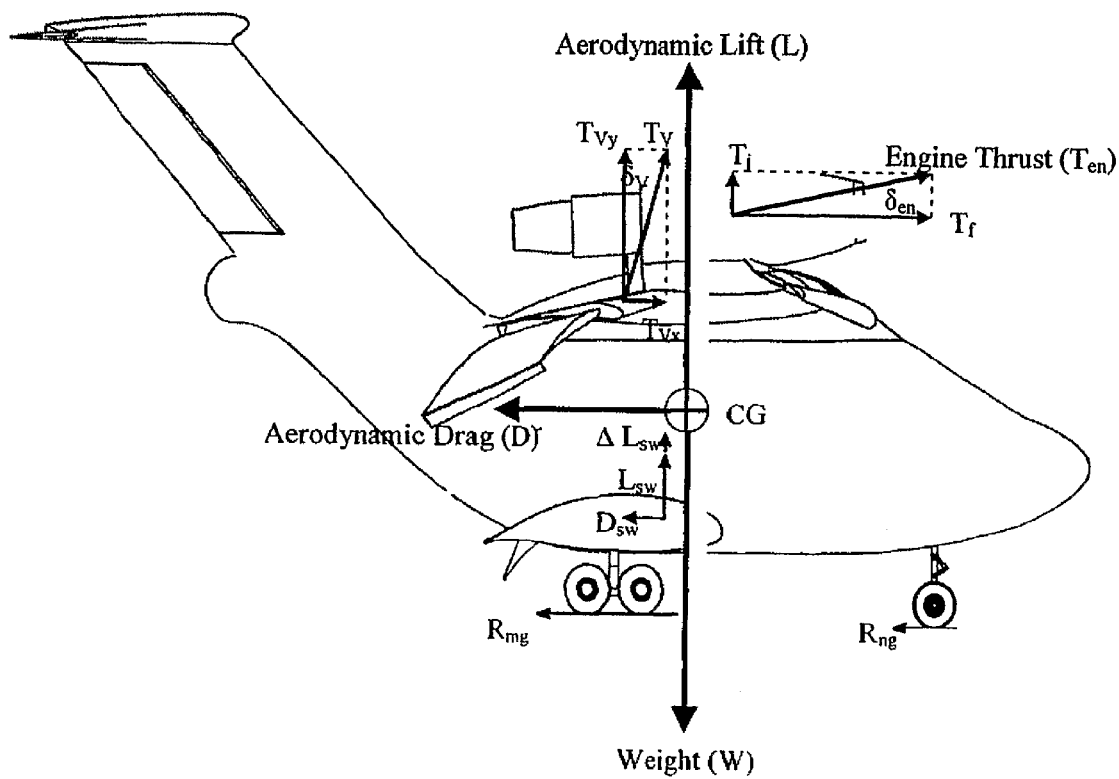
FIG. 8 shows a free body diagram of the aircraft shown in FIG. 4.

With all the forces and parameters specified, for the following free-body diagram for the aircraft is shown in FIG. 8. This free-body diagram shows only the external forces on the aircraft, at zero angle of attack ($\alpha$), wherein the friction resistance force R is $R:R_{mg}$ (main gear)+$R_{ng}$ (nose gear), L denotes the total aerodynamic lift of aircraft less stubwing lift, D the total aerodynamic drag of aircraft less stubwing drag, $L_{sw}$ the stubwing lift, $D_{sw}$ the stubwing drag, $\Delta L_{sw}$ the lift increment of stubwing due to jet entrainment, $T_j$ the vertical component of engine thrust, $T_f$ the forward engine thrust, $T_v$ the thrust vectoring force due to jet deflection under the wing, $T_{vx}$ the horizontal component of thrust vectoring force, $T_{Vy}$ the vertical component of thrust vectoring force and CG the center of Gravity.

The runway ground-roll forward-motion equations become $$\frac{W}{g}\frac{dV}{dt} = [T_f - D - \mu(W - L_{tot})] \quad (16)$$

$$= [T_o - D - \mu(W - L)] - [k(V)T_o - \mu k(V)T_o]$$

$$\frac{ds}{dt} = V$$

Although the augmentation upward thrust reduces the forward thrust, the overall forward force exceeds the net engine forward thrust, because an augmentation of lift proportionately reduces the rolling friction.

Computational Results

Total Lift vs. Ground Roll Distance

It has been found that the downward-jet should begin not at the start of the ground roll, but at a more strategic time, in order to allow speed hence aerodynamic lift to increase rapidly so that the needed upward thrust absorbs only a percentage of the total engine thrust. In the example, for instance, 10 to 15% of the total engine thrust directed upward is sufficient to allow the aircraft to lift off. The aerodynamic lift contributes the bulk of total lift, with the upward thrust contributing just that additional upward force sufficient for the aircraft to take off within 125 m.

As the available maximum thrust increases, the aircraft's speed during ground roll can reach larger magnitudes, which requires a smaller magnitude of upward thrust for lift-off within 125 m.

As the available maximum thrust increases, the aircraft's speed during ground roll can reach larger magnitudes, which requires a smaller magnitude of upward thrust for lift-off within 125 m.

Assuming rolling resistance and aerodynamic drag is neglected and there is no upward thrust, from energy equation:

$$s = \frac{1}{2}\frac{mV^2}{T} \quad (17)$$

If $C_L$ is the lift coefficient at level flight at V, $$V^2 = \frac{2W}{\rho_o \sigma S C_L} \quad (18)$$

where $$\sigma = \frac{\rho_{TO}}{\rho_o}.$$

Therefore, $$s = \frac{(W/S)}{(T/W)g\rho_o \sigma C_L} \quad (19)$$

where $$\left(\frac{W}{S}\right)$$

is the wing loading and $$\left(\frac{W}{T}\right)$$

is the thrust loading.

According to Corke (2003), the take-off parameter (TOP) is defined as $$TOP = \left(\frac{W}{S}\right)_{TO} \frac{1}{C_{Lmax}} \left(\frac{W}{T}\right)_{TO} \frac{1}{\sigma} \quad (20)$$

The governing equations for the aircraft during take off can be derived as $$\frac{W}{g}\frac{dV}{dt} = T_f - D - \mu(W - L_{tot}) \quad (21)$$

To approximate the ground roll distance:

$$ds = Vdt = \frac{VdV}{dV/dt} = \frac{d(V^2)}{2(dV/dt)} \quad (22)$$

Thus, $$\frac{dV}{dt} = g\left[\frac{T}{W} - \mu - \frac{\rho}{2(W/S)}(C_D - \mu C_L)V^2\right] \quad (23)$$

By assuming $$K_T = \frac{T}{W} - \mu$$

and $$K_A = \frac{\rho}{2(W/S)}(\mu C_L - C_D),$$

it can be shown that $$\frac{dV}{dt} = g[K_T + K_A V^2] \quad (24)$$

$$S_{GTO} = \int_0^{V_R} \frac{d(V^2)}{2g(K_T + K_A V^2)} \quad (25)$$

$$S_{GTO} = \frac{1}{2gK_A} \ln\left(1 + \frac{K_A}{K_T} V_R^2\right) \quad (26)$$

Alternatively, eq. (25) can also be expressed as $$S_{GTO} = \int_0^{V_R} \frac{d(V^2)}{T_f - D - \mu(W - L)} \quad (27)$$

$$S_{GTO} = \frac{1.21(W/S)}{g\rho(C_L)_{max}[T/W - D/W - \mu(1 - L/W]_{0.7V_{LO}}} \quad (28)$$

From eq. (28), $$S_{GTO} \propto \left(\frac{W}{S}\right)$$

and by knowing that $$V^2 = \frac{2}{\rho C_L}\left(\frac{W}{S}\right) \propto \left(\frac{W}{S}\right).$$

Therefore, $S_{GTO} \propto L_{tot} \propto V^2$. This formula proves that the linear trends of total aerodynamic lift vs ground roll distance shown in the charts are acceptable for the conceptual design.

Forward Speed Vs. Ground Roll Distance

By using thrust vectoring, the forward speed of the aircraft will be reduced. As higher thrust is used, the forward speed at the 125 m mark becomes higher and reduces the percentage of thrust deflected downwards.

Forward Speed vs. Ground Roll Time

Using higher thrust settings will reduce the time for the aircraft to reach 125 m mark, hence shorter takeoff time. The time to reach the 125 m mark are respectively 6.2 s, 6 s and 5.5 s for thrust settings 4750 lbf, 5000 lbf and 6000 lbf.

It will of course be appreciated that the above description of the preferred embodiment is made by way of example only and that modifications to the preferred arrangements are possible within the scope of the appended claims.

It will for example be appreciated that, while the central tube/hot core 12 has been described hereinbefore as having four longitudinally contiguously arranged annular sections, other central tubes/hot cores may comprise a different number of longitudinally contiguously arranged annular sections or may be formed of only a single annular section, while still falling within the scope of the present invention.

The annular segment 40, 42 and 44 of the above described embodiment are further shown as comprising three segments. In other embodiments in accordance with the present invention each or a segment may, however, comprise a different number of segments or be made of a single piece.

The central tube/hot core 12 has further been described as having segments with differing porosities. It will be appreciated that this is not essential to the present invention and central tubes/hot cores that have a substantially constant but non-zero porosity along their length are also envisaged.

The fibre materials specified hereinbefore were further mentioned by way of example only and the use of other metallic materials suitable for withstanding the environmental conditions prevalent in the module 10 is of course also envisaged.

The invention claimed is:

1. An aircraft comprising:
a body;
a pair of wings affixed to an upper portion of the body;
a pair of airfoils mounted to a lower portion of the body; and
a pair of bypass turbofan engines each of said engines being mounted to one of the wings,
wherein each engine comprises a module comprising
a generally elongated casing,
a central portion extending through the length of the module for exhausting the hot exhaust gas from the engine, and
a peripheral portion surrounding the central portion for the bypass air from the engine;
wherein the casing includes at least one outlet provided from the peripheral portion of the module through the casing to enable a portion of the bypass air to be separated from a remainder of the bypass air and to be directed out of the module in a direction towards the body and at an angle relative to the axis of the module;
wherein the engines and modules are arranged so that at least part of the portion of the bypass air directed out of each module flows over at least part of an upper surface of one of the airfoils when the aircraft travels at a predetermined speed.

2. The aircraft according to claim 1, further comprising actuating means arranged to cause the portion of bypass air to be directed out of the module at the angle to the axis of the module when the predetermined speed of the aircraft is reached.

3. The aircraft according to claim 1, wherein an opening state of the outlet is selectively controllable.

4. The aircraft according to claim 1, wherein an adjustable baffle is provided within the peripheral portion of the module.

5. The aircraft according to claim 1, further arranged so that the opening state of the outlet and/or a deployment state of the adjustable baffle is/are selectively controllable to vary the amount of bypass air that is allowed to exhaust through the opening.

6. The aircraft according to claim 1, arranged so that the relative orientation of the air through the outlet is selectively controlled.

7. The aircraft according to claim 1, further including a separator between the central and peripheral portions.

8. The aircraft according to claim 7, wherein the separator is in the form of an open network of porous mesh, preferably in the form of a porous ferrite fibre mesh.

9. The aircraft according to claim 7, further comprising a means for restricting fluid flow through the wall of the separator.

10. The aircraft according to claim 9, wherein the means for restricting fluid flow is adapted to allow more fluid to pass through a downstream part of the separator than through a part of the separator further upstream than the downstream part.

11. The aircraft according to claim 9, wherein the means for restricting fluid flow is a sleeve that includes holes that permit an amount of air to pass through the separator.

12. The aircraft according to claim 8, wherein the porosity of the porous fibre mesh at a downstream part of the separator is higher than the porosity of the porous fibre mesh in a part upstream of the downstream part.

13. The aircraft according to claim 12, wherein the porosity of the porous fibre mesh increases along the length of the separator in a downstream direction.

14. The aircraft according to claim 8, wherein the separator is formed of a plurality of portions arranged adjacent each other along a length of the separator, wherein the properties of at least one said portion differs from the properties of another one of said portions.

15. The aircraft according to claim 14, wherein the separator, or a said portion of the separator is an annulus formed of a plurality of segments, each said segment extending around only a fraction of the circumference of the annulus.

16. The aircraft according to claim 1, further including sensors provided to sense the extent to which the outlets are open and/or the direction of the airflow through the outlets and/or the velocity of air passing through the outlets to ensure that these are substantially equal.

17. The aircraft as claimed in claim 1, wherein the predetermined speed is approximately equal to the normal stalling speed of the aircraft or a speed suitable for take off and/or landing of the aircraft.

18. The aircraft as claimed claim 1, wherein the part of the upper surface is a downstream part of the upper surface.

19. A method of operating an aircraft as claimed in claim 1 during take-off, comprising:
   accelerating the aircraft to a or the predetermined speed;
   starting to re-direct the portion of the bypass air once the predetermined speed has been reached.

20. The method as claimed in claim 19, further comprising ceasing to re-direct the portion of the bypass air after the aircraft has lost contact with the ground.

21. A computer program product adapted to perform the method according to claim 19 when executed.

22. A method of operating an aircraft as claimed in claim 1 during landing, comprising:
   approaching a runway at a landing speed;
   starting to re-direct the portion of the bypass air while the aircraft is airborne.

23. A method of operating an aircraft as claimed in claim 22, further comprising after the step of starting to redirect the portion of the bypass air decelerating the aircraft to a speed that is lower than a normal stalling speed of the aircraft while the aircraft is airborne.

24. A computer program product adapted to perform the method according to claim 22 when executed.

* * * * *